March 10, 1964　　　L. K. KIRCHMAYER　　　3,124,699
APPARATUS FOR CONTROLLING THE INTERCHANGE OF POWER
BETWEEN A PLURALITY OF POWER SYSTEMS
Filed Nov. 28, 1960　　　　　　　　　　　　　　9 Sheets-Sheet 1

*INVENTOR.*
LEON K. KIRCHMAYER
BY
*Irving M. Freedman*
HIS ATTORNEY

March 10, 1964 L. K. KIRCHMAYER 3,124,699
APPARATUS FOR CONTROLLING THE INTERCHANGE OF POWER
BETWEEN A PLURALITY OF POWER SYSTEMS
Filed Nov. 28, 1960 9 Sheets-Sheet 2

INVENTOR.
LEON K. KIRCHMAYER
BY
*Irving M. Freedman*
HIS ATTORNEY

—··— INTERAREA NET INTERCHANGE SIGNAL
———— INTERAREA INCREMENTAL COST SIGNAL

March 10, 1964 L. K. KIRCHMAYER 3,124,699
APPARATUS FOR CONTROLLING THE INTERCHANGE OF POWER
BETWEEN A PLURALITY OF POWER SYSTEMS
Filed Nov. 28, 1960 9 Sheets-Sheet 4

*INVENTOR.*
LEON K. KIRCHMAYER
BY Irving M. Freedman
HIS ATTORNEY

March 10, 1964

L. K. KIRCHMAYER 3,124,699

APPARATUS FOR CONTROLLING THE INTERCHANGE OF POWER
BETWEEN A PLURALITY OF POWER SYSTEMS

Filed Nov. 28, 1960

*INVENTOR.*
LEON K. KIRCHMAYER
BY Irving M. Freedman

HIS ATTORNEY

INVENTOR.
LEON K. KIRCHMAYER
BY Irving M. Freedman
HIS ATTORNEY

INVENTOR.
LEON K. KIRCHMAYER
BY
Irving M. Freedman
HIS ATTORNEY

United States Patent Office 3,124,699
Patented Mar. 10, 1964

3,124,699
APPARATUS FOR CONTROLLING THE INTERCHANGE OF POWER BETWEEN A PLURALITY OF POWER SYSTEMS
Leon K. Kirchmayer, Scotia, N.Y., assignor to General Electric Company, a corporation of New York
Filed Nov. 28, 1960, Ser. No. 72,099
28 Claims. (Cl. 307—57)

This invention relates to electric power control systems, and more particularly, to apparatus and methods of controlling most economically the interchanges of power between the plurality of interconnected member systems of a power pool. The present invention may be considered an improvement on and/or extension of the power control system which is the subject of United States Patent 2,839,692, granted June 17, 1958, on application Ser. No. 601,298, filed July 31, 1956, by L. K. Kirchmayer and assigned to the assignee of the present invention and also an improvement on and/or extension of the co-pending application, Ser. No. 810,062, entitled "Electrical Power Computer Apparatus," filed April 30, 1959, by L. K. Kirchmayer as a continuation-in-part of United States patent application, Ser. No. 792,728, filed February 12, 1959, now abandoned, and also assigned to the same assignee as the present invention.

It is common practice for neighboring power systems, each comprising a plurality of interconnected generators and generating stations, to be interconnected by one or more tie lines over which an interchange of power is made according to preselected schedules. The above-referenced patent discloses an automatic dispatching system capable of controlling simultaneously system frequency, system net interchange, and economic allocation of generation within each system. However, the net interchange of power between systems has been set manually and has been determined by contracts and bargaining with neighboring power systems. The rapidly increasing demand for electrical energy has stimulated both an increase in the number of stations within power systems and the expansion of transmission networks for interconnecting many power systems to form power pools. This expansion of power networks has increased the problems of maintaining efficient cooperation and power interchange between the interconnected systems.

A power transmission system wherein a plurality of local systems are interconnected to exchange power is hereafter termed an "integrated power transmission system" or power pool. Power may be transferred between a pair of local systems of an integrated power transmission system by direct transmission over tie lines connecting together the two local systems, by "wheeling" power through a third local system which serves to connect together the two local systems, or by a combination of these two transmission methods. Such an integrated power transmission system is most economically operated when each local system can receive power from each of the other local systems thereof at the same incremental cost, and when this incremental cost is the same as the incremental cost of power received from the local generating units. In preparing an interchange schedule for an integrated power transmission system, consideration must also be given as to whether it is more economical for each local system to receive or to supply interchange power, recognizing the transmission losses involved. This schedule must also consider the common incremental cost of power of each local system and the effect that the receipt or supply of interchange power has on altering this common incremental cost. To prepare a schedule for determining the most economic generation of an integrated system is, therefore, a time-consuming task of great magnitude. If the schedule is computed manually, it must be prepared ahead of its time of employment, and only predicted values of load can be economically satisfied. To maintain such a scheduled power interchange, so as to meet the actual and changing load conditions in the integrated system, is obviously difficult to achieve if only manual computation and control are employed. Therefore, an integrated power transmission system can only be kept continuously operating most economically by employing an automatic computing and control system, which will continuously consider and utilize the mass of data involved.

It has been suggested, for example, in the AIEE Conference Paper of H. H. Chamberlain, A. F. Glimn, and L. K. Kirchmayer, entitled "Automatic Operation of Interconnected Areas" presented at the AIEE summer and Pacific general meeting, San Francisco, California, June 1956, that one approach to obtaining economic operation of the integrated power station system is to treat the several systems as one. This would require the use of a centralized computer controller to serve the integrated system. The centralized computer would require a knowledge of all plant loadings and external interconnection flows plus a control or transmission channel to each plant.

This aforesaid AIEE paper also suggests an alternative approach of a decentralized method in which each power system utilizes its own automatic dispatching system which is coupled to centralized means for automatically determining and controlling the most economic interchange of power between the systems. The automatic dispatching system or ADS for each power system may be of the type disclosed and claimed in the aforesaid patent. With such an arrangement each system requires a knowledge of the plant loadings in the system and the interconnection power flows out of the system in addition to control information instructing the system either to increase or decrease its delivery to the pool. This decentralized approach in certain cases offers important advantages over the centralized approach through reduction in telemetering channel requirements, use of smaller decentralized computer-controllers, and the ready availability of information for cost accounting between systems for the power interchanged.

Operation of such a decentralized integrated network is based upon the principle that when the incremental cost of delivering power to any particular point in a given group of systems is the same from all sources, the integrated power transmission system is in economic dispatch. This principle is discussed in more detail in L. K. Kirchmayer's Economic Operation of Power Systems, chapter 5, John Wiley & Sons, Inc., New York, 1958, and in L. K. Kirchmayer's Economic Control of Interconnected Systems, John Wiley & Sons, Inc., New York, 1959.

It is a primary object of the present invention to provide improved apparatus for automatically controlling the generation or output of a plurality of generators, generating stations and generating systems comprising an integrated power system that is capable of loading for maximum economy, and simultaneously holding the system frequency at a predetermined value.

Another object of this invention is to provide apparatus for controlling the output of an integrated power system in which the individual systems utilize individual automatic dispatching systems and means are provided for computing and deriving and utilizing control signals for the automatic economic interchange of power between the local systems.

Yet another object of the present invention is to provide apparatus and means for automatically economically controlling the output of an integrated power system comprising three or more local systems each including an automatic dispatching system.

Another object of this invention is to automatically control the power generation of each local power transmission system of an integrated power transmission system to provide interchange power by each local system from the other local systems at a common incremental cost.

Another object of this invention is to provide apparatus for automatically controlling the power generation of all generating units of an integrated power transmission system for receipt of power by each local system of said integrated system from the other local systems and from the local generating units at a common incremental cost.

Another object of this invention is to provide apparatus for automatically controlling the interchange power in an integrated power transmission system for most economic operation thereof, while also controlling the generation within each local power transmission system on an economic basis.

Another object of this invention is to provide apparatus for automatically controlling the power transferred on a plurality of transmission tie lines which connect a local power transmission system with a plurality of other local power transmission systems.

Another object of this invention is to provide apparatus for rapidly automatically controlling the control action of each local system of an integrated power transmission system at equal incremental costs of delivered power.

Another object of this invention is to provide apparatus for automatically controlling the output of an integrated power system in an economic manner and in which the components permit planned expansion without rendering the existing equipment obsolete.

Another object of this invention is to provide apparatus for automatically controlling the output of an integrated power system and requiring a minimum number of communication channels between the local systems thereof.

Another object of this invention is to provide apparatus for automatically controlling the interchange power in an integrated power transmission system which requires no readjustment of the controller equipment when additional generating units are added or removed from service.

Yet another object of this invention is to provide apparatus for automatically economically controlling the interchange power in an integrated power transmission system in which the station generation recorders are not an integral part of the control system and may be removed from service for maintenance without interrupting area control.

Further objects and advantages of this invention will become apparent as the following description proceeds, and the features of novelty which characterize this invention will be pointed out with particularity in the claims annexed to and forming part of this specification.

In accordance with one form of the invention, an electric power control system is provided for automatically and economically controlling the generation of an integrated power transmission system having at least three interconnected local power generating systems with each local system including means to automatically control in an economic manner the generation of the generating stations therein, and tie lines interconnecting each of the local systems with at least one of the other local systems for power interchange therebetween. The integrated system includes means to provide incremental power cost comparisons between $n-1$ different pairs of local power systems where $n$ represents the number of local power systems in the integrated power transmission system.

The cost comparison means receives incremental power cost signals for interchanging power between a particular pair of systems being compared thereby plus an incremental wheeling cost signal from at least one other local system and combines the cost signals to provide interchange power signals for each of the local systems of the particular pair being compared. The interchange power signals are transmitted to the local systems being compared and means are provided to vary the generation of the local systems in response to their respective interchange signals to cause power to be delivered on the tie lines interconnecting the pair of stations at equal incremental costs of delivered power.

More particularly, the comparison means algebraically combines the incremental power cost and wheeling cost signals to provide resultant interchange signals having equal amplitude and opposite effect. At least one local system is the reference system for cost comparisons between the reference and at least two other local systems with the cost comparison for the reference system including a plurality of interchange signals developed therefor such that the generation in the integrated power system is varied to deliver power to any point within the integrated system from substantially all sources at equal incremental costs. The means to vary the generation of the local systems include means to combine the interchange power signals for such systems with signals representing the scheduled and actual power interchange thereof.

The features of this invention which are believed to be novel are set forth with particularity in the appended claims. The invention itself may be better understood as to organization and construction as well as to further objects and advantages by reference to the following description taken in conjunction with the accompanying drawings in which:

For purposes of simplicity in explaining the operation of the subject invention the theory of operation of a two system pool having only a single interconnecting tie will be discussed prior to the more specific discussion of an integrated power network comprising three or more local systems and a plurality of interconnecting ties.

TWO SYSTEM POOL WITH SINGLE INTERCONNECTION

Figure 1:
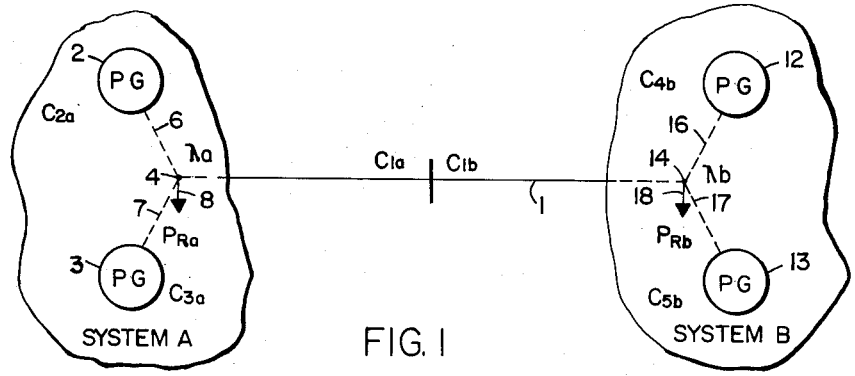
FIG. 1 is a schematic representation of two local interconnected power systems helpful in explaining and understanding the invention.

FIG. 1 shows a schematic representation of two local power systems or areas, A and B, interconnected by a power transmission tie line 1. Local power system A includes a plurality of generating stations and/or units $P_G$ identified as 2 and 3 which may be physically at different geographical locations within the system. The generating stations 2 and 3 are connected together at a common point 4 and to the local system load 8 or received load $P_{Ra}$ by transmission lines 6 and 7, respectively. Similarly, in local system B, the generating stations or units $P_G$, identified as 12 and 13, are connected to a common point and to the local load 18 $P_{Rb}$ via lines 16 and 17, respectively.

For economic dispatching within a given area it is necessary that the incremental cost of received power from each source be the same. See chapters 5 and 6 of the aforementioned textbook, Economic Control of Interconnected Systems, for a detailed discussion of the theory of the analysis of losses and economic operation of interconnected areas.

Thus for local system A, as shown in FIG. 1:

$$C_{1a}L_{1a} = \lambda_a \quad (1)$$

$$\frac{dF_2}{dP_2}L_{2a} = \lambda_a \quad (2)$$

$$\frac{dF_3}{dP_3}L_{3a} = \lambda_a \quad (3)$$

where:

$C_{1a}$ = incremental cost at bus 1 referred to system A
$L_{na}$ = penalty factor of source $n$ in system A
$\lambda_a$ = incremental cost of received power in system A
$dF_n/dP_n$ = incremental production cost of plant $n$ Similarly, for local system B to be operating most economically it is necessary that $$C_{1b}L_{1b} = \lambda_b \quad (4)$$

$$\frac{dF_4}{dP_4}L_{4b} = \lambda_b \quad (5)$$

$$\frac{dF_5}{dP_5}L_{5b} = \lambda_b \quad (6)$$

where:

$C_{1b}$ = incremental cost at bus 1 referred to system B
$L_{nb}$ = penalty factor of source $n$ in system B
$\lambda_b$ = incremental cost of received power in system B The incremental cost relations are indicated on FIG. 1.

For both systems to be operated so that the pool formed thereby may be scheduled most economically, it is necessary that the net interchange between systems A and B be of such magnitude that the incremental cost of the interchange at bus 1 will be the same when referred to either system. In other words, it is desired that $$C_{1a} = C_{1b} \quad (7)$$

Equations 1 and 4 may be used in relating the incremental cost of received power in each area to the incremental cost at bus 1. Thus we may write $$C_{1a} = \frac{\lambda_a}{L_{1a}} \quad (8)$$

$$C_{1b} = \frac{\lambda_b}{L_{1b}} \quad (9)$$

If it is assumed that $\lambda_a$, $\lambda_b$, $L_{1a}$, and $L_{1b}$ are available from the local system dispatching systems, $C_{1a}$ and $C_{1b}$ may be calculated as shown by Equations 8 and 9, respectively. From a comparison of $C_{1a}$ with $C_{1b}$ information is obtained to indicate the manner in which the net interchange schedule settings for each area should be modified.

An automatic arrangement for effecting the cost comparison discussed above is shown in block diagram form in FIG. 2.

Figure 2:
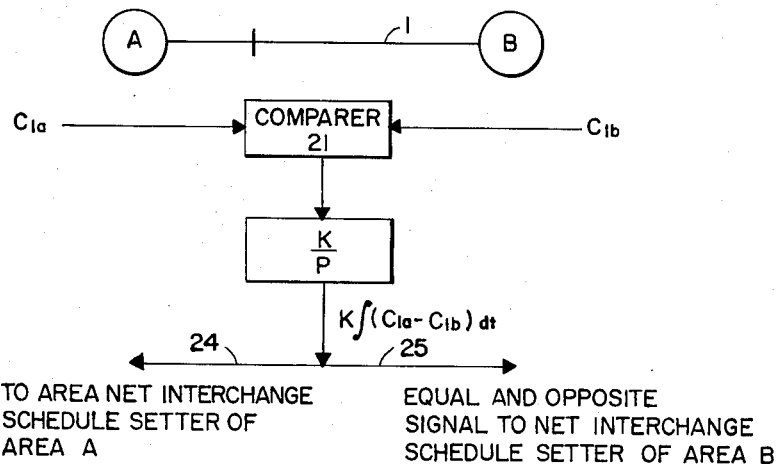
FIG. 2 is a block diagram representation of the signals related to the comparison equipment which forms a part of the invention.

Referring to FIG. 2, the cost signal $C_{1a}$ is compared with the cost signal $C_{1b}$ by comparer 21. If the cost $C_{1a}$ is less than $C_{1b}$, a signal is sent via connection 24 to the automatic dispatching equipment of local system A to increase the scheduled net interchange out. This same signal, but with opposite sign, is sent via connection 25 to the automatic dispatching equipment of B, and the net interchange schedule for B is adjusted to decrease its net interchange out by the same amount that A was increased. This correcting action continues until $C_{1a} = C_{1b}$. Assuming no external interconnections, it is necessary for proper operation of the load-frequency controllers that the sum of the net interchange schedules for this two area system remain equal to zero. If this relation between the interchange schedules is not maintained, a sustained frequency error will occur. If there are external interconnections of the two local systems with other adjoining systems, the sum of the next interchange schedules for the two systems should be equal to the desired total interchange to the external systems.

Circuitry useful in the comparison equipment of FIG. 2 will be discussed in detail below in reference to FIG. 17.

TWO AREA SYSTEM CONTROL EQUIPMENT

Figure 3:
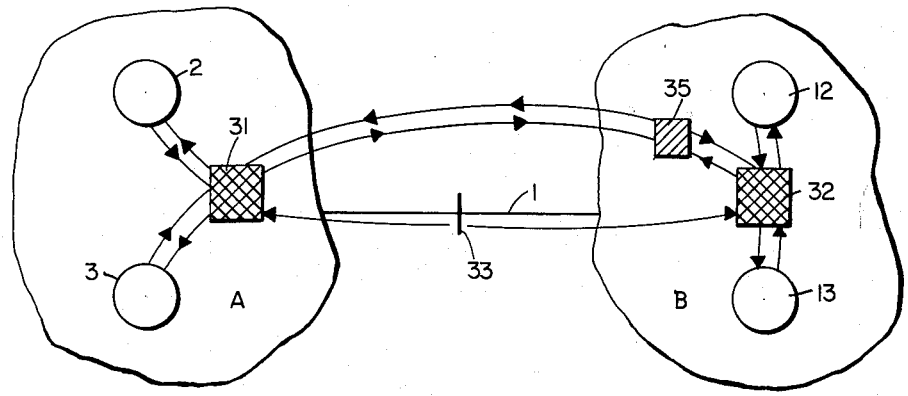
FIG. 3 is a schematic representation in block diagram form of the principal equipment required for a two area power pool.

FIG. 3 illustrates in schematic form the computer-controller equipment to carry out the control action described above. Referring to FIG. 3, it is seen that local power systems A and B each include their own automatic dispatching system equipment 31, 32, respectively. This equipment may be of the type described in the aforementioned Kirchmayer Patent 2,839,692 and/or that described in some detail in chapter 2 of the aforementioned textbook Economic Control of Interconnected Systems by Kirchmayer.

In order to control local systems A and B automatically for maximum economy, two prerequisites should be met. First, the local power systems must be individually dispatched to obtain equal incremental cost of delivered power within their own boundaries, and second, the worth of power at the common tie point must be available. The automatic dispatching systems 31 and 32 automatically carry out an economic dispatch for local systems A and B based on machine incremental cost data and incremental transmission losses and will provide these prerequisites.

To obtain operation of the two local systems A and B at maximum over-all economy, it is necessary to compare the incremental cost of power at the tie point 33 of interconnecting tie 1 and to send to the local power systems power interchange signals of equal magnitude and opposite sign. These signals operate in the manner of a net interchange schedule setter until the generation of two local power systems is varied to bring about equal incremental cost at the common tie point 33. In order to accomplish this for a two local power system pool, it is necessary to provide comparison equipment 35 and two telemetering channels between the system. The comparison equipment 35 may be physically located in either local power system A or B, or intermediate therebetween in a third location.

TWO SYSTEM POOL WITH MULTIPLE TIES

In the case where there are multiple interconnecting ties or tie lines between the two systems it is necessary to consider the incremental losses incurred over each of the parallel paths for optimum economic operation of the integrated power system. Such a two system pool is shown schematically in FIG. 4.

Figure 4:
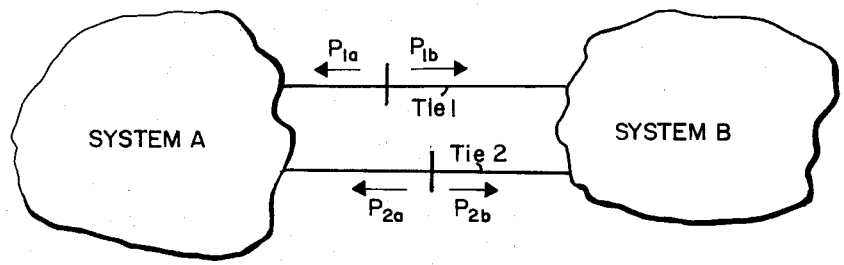
FIG. 4 is a schematic representation of a two area pool having multiple tie lines interconnecting the area.

Referring to FIG. 4, local power systems A and B are interconnected by busses or ties indicated as tie 1 and tie 2, respectively. For simplicity, the generating stations and/or generators within each local power system have been omitted in FIG. 4.

By letting $P_{ea}$=net interchange or excess flow out of system A $$P_{ea} = P_{1b} + P_{2b} = -P_{1a} - P_{2a} \quad (10)$$

Let $C_{ea}$=incremental cost at boundary referred to system A for delivering an increment of power from the hypothetical load of system A to the hypothetical load of system B $C_{eb}$=incremental cost at boundary referred to system B for delivering an increment of power from the hypothetical load of system B to the hypothetical load of system A Then $$C_{ea} = \lambda_a + \lambda_a \left( \frac{\partial L_{Ta}}{\partial P_{1a}} \frac{\partial P_{1a}}{\partial P_{ea}} + \frac{\partial L_{Ta}}{\partial P_{2a}} \frac{\partial P_{2a}}{\partial P_{ea}} \right) \quad (11)$$

and $$C_{eb} = \lambda_b - \lambda_b \left( \frac{\partial L_{Tb}}{\partial P_{1b}} \frac{\partial P_{1b}}{\partial P_{ea}} + \frac{\partial L_{Tb}}{\partial P_{2b}} \frac{\partial P_{2b}}{\partial P_{ea}} \right) \quad (12)$$

For optimum economy, $$C_{ea} = C_{eb} \quad (13)$$

where:

$\frac{\partial L_{Ta}}{\partial P_{1a}}$=ratio of change in transmission loss in system A to change in tie flow $P_{1a}$ when delivering an increment of power from tie 1 to the hypothetical load of system A, assuming that no changes in the remaining variables occur $\frac{\partial L_{Ta}}{\partial P_{2a}}$ is similarly defined for $P_{2a}$ $\frac{\partial L_{Tb}}{\partial P_{1b}}, \frac{\partial L_{Tb}}{\partial P_{2b}}$ are similarly defined for system B $\frac{\partial P_{1a}}{\partial P_{ea}}$=ratio of the change in tie flow into system A at tie 1 to the change in excess flow out of system A when an increment of power is delivered from the hypothetical load of system A to the hypothetical load of system B $\frac{\partial P_{2a}}{\partial P_{ea}}$=same as above but with respect to the flow into system A at tie 2

The development of the relationships set forth in equations 11 and 12 may be better understood by reference to chapter 6, "Theory of Operation of Interconnected Areas," of the aforementioned book Economic Control of Interconnected Systems, and in particular to Section 6.3 thereof entitled, "Coordination Methods for Two Radially Interconnected Areas."
Since $$P_{2b} = -P_{1a}$$
$$P_{2b} = -P_{1a}$$

Note that $$\frac{\partial P_{1b}}{\partial P_{ea}} = -\frac{\partial P_{1a}}{\partial P_{ea}}$$

$$\frac{\partial P_{2b}}{\partial P_{ea}} = -\frac{\partial P_{2a}}{\partial P_{ea}}$$

In areas having transmission systems with approximately the same $X/R$ ratios, the comparison of costs between areas is greatly simplified. For this case, for example, the cost of delivering an increment of power from system A to tie point 1, including the parallel path offered by system B, may be closely approximated by $$C_{1a} = \frac{\lambda_a}{L_{1a}} \quad (14)$$

$$L_{1a} = \frac{1}{1 - (\partial L_{Ta}/\partial P_{1a})} \quad (15)$$

Similarly, the cost of delivering an increment of power from system B to tie point 1, including the parallel path offered by A, is closely approximated by $$C_{1b} = \frac{\lambda_b}{L_{1b}} \quad (16)$$

$$L_{1b} = \frac{1}{1 - (\partial L_{Tb}/\partial P_{1b})} \quad (17)$$

A cost comparison between $C_{1a}$ and $C_{1b}$ may be used to bring the net interchange between the two systems into economic balance. If desired, the costs $C_{2a}$ and $C_{2b}$ may be used in place of $C_{1a}$ and $C_{1b}$. The costs at tie 1 are, of course, not equal to the costs at tie 2. Application of these principles to a given pool is illustrated below.

NUMERICAL ILLUSTRATION OF
TWO SYSTEM POOL

Figure 5:
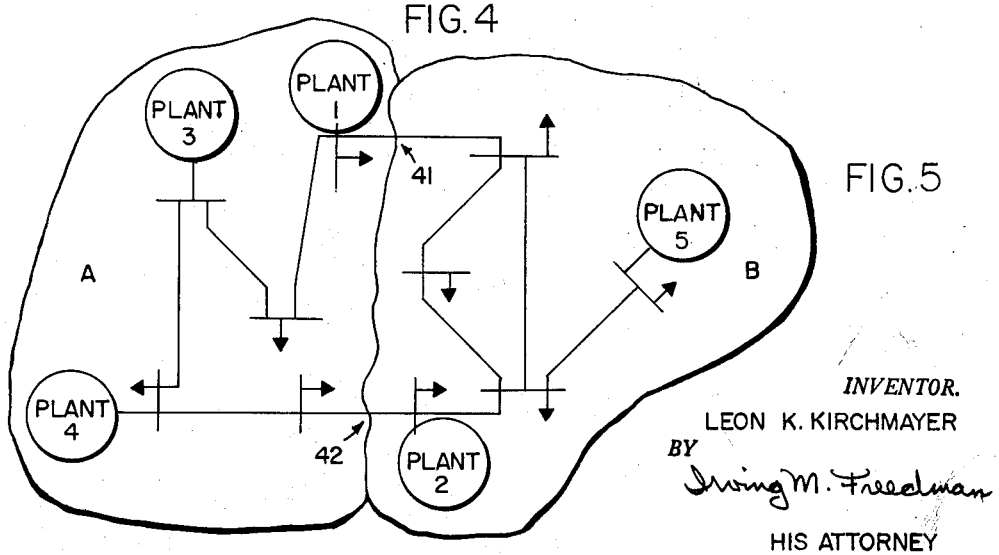
FIG. 5 is a simplified diagram of a two area pool useful in explaining a numerical illustration involving the basic operation of the subject type of power system.

Considering for a numerical illustration of a two system pool, the simple system of FIG. 5, the meter points, 41 and 42, form the boundary dividing the pool into two operating systems or areas, A to the left, B to the right. The $X/R$ ratios of systems A and B vary from approximately 3/1 to 4/1.

Figure 6:
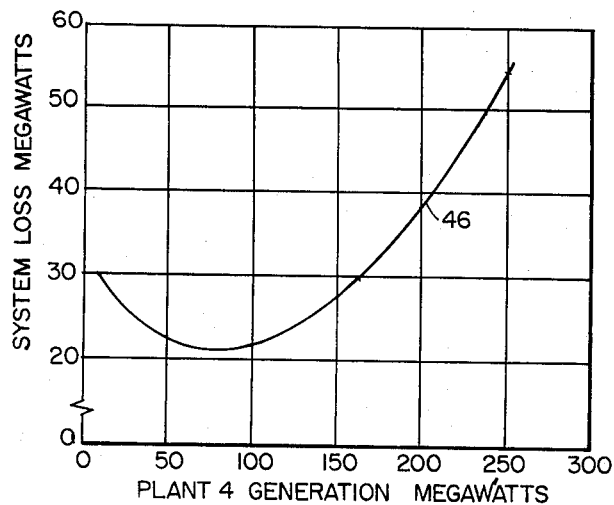
FIG. 6 is a plot of system loss versus generation illustrating the transmission losses of the system of FIG. 5 for transfer of generation between particular plants thereof.

In making economic comparisons of different modes of operation, by way of a numerical illustration, the case is considered in which the economy of operation is restricted to balancing the generation at plant 4 in area A and plant 5 in area B for minimum fuel input. A.-C. network analyzer data may be obtained by holding loads constant, for various exchanges between these two plants. The incremental fuel-cost characteristics of plant 4 and plant 5 were such that most economic interchange was approximately 100 mw. from area A to area B. Network-analyzer data taken permits plotting the curve of losses against plant 4 generation. The use of the curve 46, shown in FIG. 6, permits the determination of the most economic net interchange by solution of the coordination equations described in chapter 8 of the aforementioned textbook Economic Operation of Power Systems by Kirchmayer. Thus $$C_5 = \frac{1}{1 - (\Delta P_{L4-5}/\Delta P_4)} C_4 \quad (18)$$

where:

$C_5$=incremental cost of plant 5 generation in dollars per mw.-hr.
$= 0.004601 P_5 + 2.1036$ $C_4$=incremental cost of plant 4 generation in dollars per mw.-hr.
$= 0.001875 P_4 + 1.75$ $\frac{\Delta P_{L4-5}}{\Delta P_4}$=incremental loss in transferring power from plant 4 to plant 5

A comparison of the desirable allocation of generation determined by Equation 18 may be made with generation schedules calculated by using (1) a total-loss formula for the entire system and (2) separate total-loss formulas for each system.

In using the total-loss formula for scheduling, costs at plant 5 and plant 4 are referred to the hypothetical load center of the power pool formed by both companies by use of the single-area coordination equation:

$$\frac{dF_n}{dP_n} + \lambda \frac{P_L}{P_n} = \lambda \quad (19)$$

where:

$\dfrac{dF_n}{dP_n}$ = incremental cost of plant $n$ $\dfrac{\partial P_L}{\partial P_n}$ = incremental loss of plant $n$ in supplying load to the hypothetical load center of the power pool formed by both systems $\lambda$ = incremental cost of received power at the hypothetical load center by both systems Equation 18 is discussed in more detail in chapter 8 of the aforementioned textbook Economic Operation of Power Systems by Kirchmayer.

In the schedule which used separate loss formulas for each area, the pool formed by the two areas was brought into economic balance by the following cost comparisons:

(1) Incremental costs at tie 1 using equations similar to Equations 14 to 17.

(2) Incremental costs at tie 2 using equations similar to Equations 14 to 17.

(3) Weighted interchange cost according to Equations 11 and 12.

In all cases, the interarea equations were of the form $$\dfrac{dF_a}{dP_{Ga}} + \lambda_a \dfrac{L_{Ta}}{P_{Ga}} = \lambda_a \qquad (20)$$

$$\dfrac{dF_b}{dP_{Gb}} + \lambda_b \dfrac{\partial L_{Tb}}{\partial P_{Gb}} = \lambda_b \qquad (21)$$

where:

$\dfrac{dF_a}{dP_{Ga}}$ = incremental production cost in dollars per mw.-hr. of a particular plant $G_a$ in area A $\dfrac{dF_b}{dP_{Gb}}$ is similarly defined for area B $\lambda_a, \lambda_b$ = incremental cost of received power in areas A and B, respectively $\dfrac{\partial L_{Ta}}{\partial P_{Ga}}$ = ratio of change in transmission loss in area A to change in $P_{Ga}$ when delivering an increment of power from $P_{Ga}$ to the hypothetical load of area A, with all other variables assumed constant. Consequently, this expression does not include the change in loss that occurs because of a change in tie flows.

$\dfrac{\partial L_{Tb}}{\partial P_{Gb}}$ = same as above but with respect to area B Equations 20 and 21 are more thoroughly discussed in chapter 6 of the aforementioned textbook Economic Control of Interconnected Systems by Kirchmayer.

A basis of comparison of the various schedules is the hourly savings realized over equal incremental production cost (losses neglected) operation. Such a comparison is given in Table 1 below:

Table 1

| Type of Schedule | Plant 1, mw. | Plant 5, mw. | Loss, mw. | Load, mw. | Savings, $/hr. | Percent of Possible Savings |
|---|---|---|---|---|---|---|
| Equal incremental (no loss consideration in obtaining schedule) | 251 | 25.7 | 54.7 | 586 | 0 | 0 |
| Exact (uses slope of I²R curve) | 161 | 90.9 | 29.9 | 586 | 37.6 | 100 |
| Total-loss formula | 166.1 | 86.9 | 31 | 586 | 37.2 | 98.1 |
| Separate loss formulas: | | | | | | |
| (a) Costs matched at bus 1 | 158.2 | 93.3 | 29.5 | 586 | 37.3 | 99.2 |
| (b) Costs matched at bus 2 | 167.7 | 85.7 | 31.4 | 586 | 36.9 | 98.1 |
| Separate loss formulas (using weighted interchange costs) | 162.7 | 89.5 | 30.2 | 586 | 37.6 | 100 |

Table 1 points out that (1) loss-formula methods realize essentially all of the available savings, and (2) coordinating both systems to a single common tie point by use of separate loss formulas provides a reasonably accurate means of determining economic loading of the pool for the case of transmission systems with approximately equal X/R ratios.

THE GENERAL CASE—THREE OR MORE SYSTEMS

Figure 7:
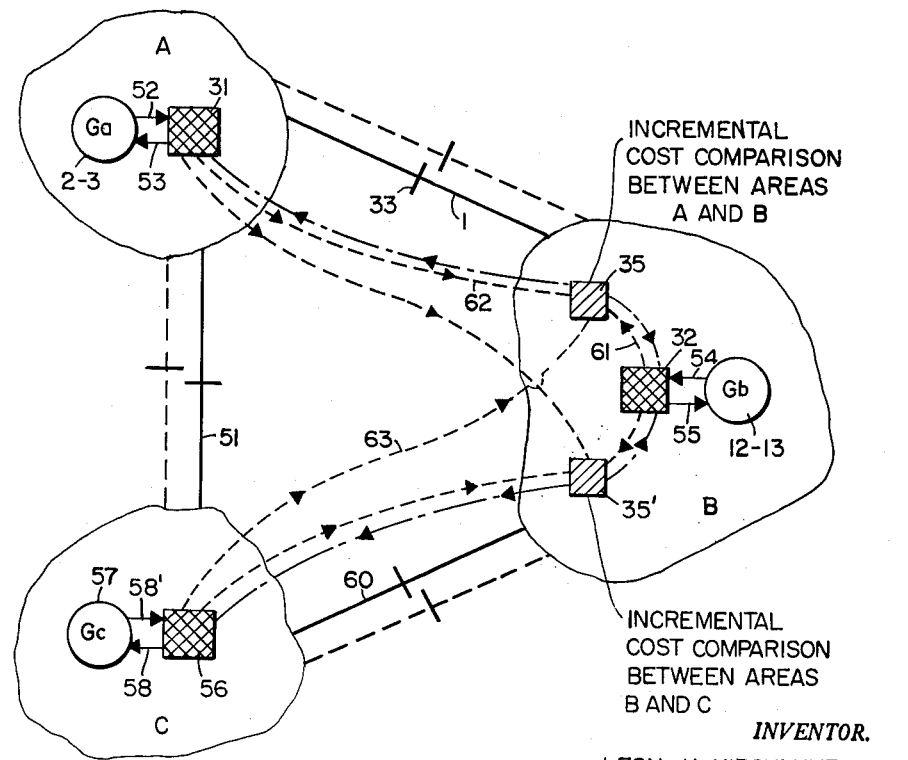
FIG. 7 is a schematic representation of the major equipment required for a pool formed by the loop interconnection of three areas.

The general case for use of the subject invention involves three or more loop-interconnected systems or areas. The considerations for economic operation of such an integrated power transmission network include that of "wheeling" power from one area to another area through the ties interconnecting each to a third area, in addition to the interchange of power directly between the first two areas. A pool formed by the loop interconnection of three areas is shown schematically in FIG. 7. FIG. 7 is an extension of the two area pool or integrated power transmission system of FIG. 3 with like components identified by similar numerals.

Referring to FIG. 7, it will be seen that area or system A is interconnected to area B by tie lines 1, and to area C by ties 51. Area A includes generating stations 2, 3 and an automatic dispatching system 31, while area B includes generating station 12, 13 and an automatic dispatching system 32. A pair of lines or communication channels 52 and 53 interconnect each station 2, 3 of area A to the automatic dispatching system for receipt of generation information and the sending of control information, respectively. Similarly, stations 12, 13 are connected to automatic dispatching system 32 by lines or communication channels 54 and 55. Area C includes its own automatic dispatching system 56 and one or more generating stations 57, each including one or more generating units (not shown) connected to the automatic dispatching system by one or more communication channels 58 and 58' for transfer of generation information and receipt of control information.

Area C is interconnected with area B by ties 60. In accordance with the present invention, an incremental cost comparison is made between $(n-1)$ areas, where $n$ is the number of areas forming the pool. Thus, for a three area pool $n-1=3-1=2$ incremental cost comparisons. The cost comparison may be made between any two pairs of areas, but as indicated in FIG. 7, by way of example, is made between areas A and B by comparer 35 and between areas B and C by comparer 35'. Comparers 35 and 35' may be physically located within area A, B, or C or at some other location. Also, the comparers may be both at a single location or physically separated. However, it is necessary to provide the required communication channels between the comparers and the automatic dispatching equipment of the areas A, B, and C. For the system of FIG. 7, the coordination equations used are of the form set forth by Equations 20 and 21 and include $$\dfrac{dF_a}{dP_{Ga}} + \lambda_a \dfrac{\partial L_{Ta}}{\partial P_{Ga}} = \lambda_a \qquad (22)$$

$$\dfrac{dF_b}{dP_{Gb}} + \lambda_b \dfrac{\partial L_{Tb}}{\partial P_{Gb}} = \lambda_b \qquad (23)$$

$$\dfrac{dF_c}{dP_{Gc}} + \lambda_c \dfrac{\partial L_{Tc}}{\partial P_{Gc}} = \lambda_c \qquad (24)$$

$$C_{a-b} = C_{b-a} \qquad (25)$$

$$C_{c-b} = C_{b-c} \qquad (26)$$

$C_{a-b}$ = incremental cost at boundary of B referred to area A for delivery from hypothetical load of area A to the hypoethetical load of area B $$= \lambda_a + \sum_i \left( \lambda_a \dfrac{\partial L_{Ta}}{\partial P_{ia}} \right) \dfrac{\partial P_{ai}}{\partial P_{ea}} + \sum_k \left( \lambda_c \dfrac{\partial L_{Tc}}{\partial P_{ck}} \right) \dfrac{\partial P_{ck}}{\partial P_{ea}} \qquad (27)$$

$C_{b-a}$ = incremental cost at boundary of B referred to area B for delivery from hypothetical load of area B to hypothetical load of area A $$=\lambda_b-\sum_j\left(\lambda_b\frac{\partial L_{Tb}}{\partial P_{bj}}\right)\frac{\partial P_{bj}}{\partial P_{ea}} \qquad (28)$$

$C_{c-b}$ = incremental cost at boundary of B referred to area C for delivery from hypothetical load of area C to hypothetical load of area B $$=\lambda_c+\sum_k\left(\lambda_c\frac{\partial L_{Tc}}{\partial P_{ck}}\right)\frac{\partial P_{ck}}{\partial P_{ec}}+\sum_i\left(\lambda_a\frac{\partial L_{Ta}}{\partial P_{ai}}\right)\frac{\partial P_{ai}}{\partial P_{ec}} \qquad (29)$$

$C_{b-c}$ = incremental cost at boundary of B referred to area B for delivery from hypothetical load of area B to hypothetical load of area C $$=\lambda_b-\sum_j\left(\lambda_b\frac{\partial L_{Tb}}{\partial P_{bj}}\right)\frac{\partial P_{bj}}{\partial P_{ec}} \qquad (30)$$

where:

$\frac{dF_a}{dP_{Ga}}$ = incremental production cost in dollars per mw.-hr. of a particular plant $G_a$ in area A $\frac{dF_b}{dP_{Gb}}, \frac{dF_c}{dP_{Gc}}$ are similarly defined for areas B and C, respectively $\lambda_a, \lambda_b, \lambda_c$ = incremental cost of received power in areas A, B, and C, respectively $\frac{\partial L_{Ta}}{\partial P_{Ga}}$ = incremental transmission loss in area A for a particular plant $G_a$ in area A, when only that plant changes $\frac{\partial L_{Tb}}{\partial P_{Gb}}, \frac{\partial L_{Tc}}{\partial P_{Gc}}$ are similarly defined for areas B and C, respectively $i$ = number of ties connected to area A
$j$ = number of ties connected to area B
$k$ = number of ties connected to area C $P_{ai}, P_{bj}, P_{ck}$ = tie line flows into areas A, B, and C, respectively $$P_{ea}=-\sum_i P_{ai}$$

$$P_{ec}=-\sum_k P_{ck}$$

$\frac{\partial L_{Ta}}{\partial P_{ai}}$ = incremental transmission loss in area A for a particular tie $P_{ai}$ $\frac{\partial L_{Tb}}{\partial P_{bj}}, \frac{\partial L_{Tc}}{\partial P_{ck}}$ are similarly defined for areas B and C, respectively $\frac{\partial P_{ai}}{\partial P_{ea}}$ = ratio of change of tie flow $P_{ai}$ into area A to change in $P_{ea}$ when an increment of power is delivered from the hypothetical load of area A to the hypothetical load of area B $\frac{\partial P_{bj}}{\partial P_{ea}}$ = ratio of change of tie flow $P_{bj}$ into area B to change in $P_{ea}$ when an increment of power is delivered from the hypothetical load of area A to the hypothetical load of area B $\frac{\partial P_{ck}}{\partial P_{ea}}$ = ratio of change of tie flow $P_{ck}$ into area C to change in $P_{ea}$ when an increment of power is delivered from the hypothetical load of area A to the hypothetical load of area B $\frac{\partial P_{ai}}{\partial P_{ec}}, \frac{\partial P_{bj}}{\partial P_{ec}}, \frac{\partial P_{ck}}{\partial P_{ec}}$ are similarly defined for areas A, B, and C, respectively, and excess power $P_{ec}$ $P_{ea}$ and $P_{ec}$ are treated as the independent net interchanges or excesses. The excess or net interchange out of area B is equal to the minus sum of $P_{ea}$ and $P_{ec}$.

The cost comparison between areas A and B is defined by Equations 25, 27, and 28. As indicated by the legend of FIG. 7 identifying the dashed line signals between areas, incremental cost signals are sent from the area automatic dispatching systems 31, 32 and 56 to the comparison equipment 35 and 35'. Incremental cost signals, for example, are sent to comparison equipment 35 in area B from ADS equipment 32 of area B via 61, from ADS equipment 31 of area A via 62, and from ADS equipment 56 of area C via 63. Similarly, incremental cost signals from the ADS equipments of each area are sent to comparison equipment 35' for the incremental cost comparison between areas B and C.

Net interchange signals are sent from the comparison equipments to the area automatic dispatching systems for areas A, B, and C. The net interchange signal indicated by the alternate long and short dashed lines of FIG. 7 are sent from the comparer 35, for example, to the ADS equipments 31 and 32 of areas A and B, respectively. Similarly, the comparer 35' for effecting the incremental cost comparison between areas B and C develops net interchange signals for both areas B and C.

The incremental cost term $$\lambda_a+\sum_i[\lambda_a(\partial L_{Ta}/\partial P_{ai})]\partial P_{ai}/\partial P_{ea}$$

is formed in the area A automatic dispatching system 31 and sent to the comparison equipment. The incremental wheeling cost signal $$\sum_k[\lambda_c(\partial L_{Tc}/\partial P_{ck})]\partial P_{ck}/\partial P_{ea}$$

is formed in the area C automatic dispatching system 56 and sent via 63 to the comparison equipment 35 where it is combined with the signal from area A to form $C_{a-b}$. The incremental cost $C_{b-a}$ is calculated by the area B dispatching system 32 and is also sent to the comparison equipment 35 via 61. The comparison between $C_{a-b}$ and $C_{b-a}$ is accomplished in comparison equipment 35 in the manner discussed above in regard to FIG. 2. The resulting interchange signals act upon the net interchange settings of areas A and B in equal and opposite manners.

The net interchange of area B is thus determined by the sum of the net interchange signals from the comparisons between A and B and also C and B.

Figure 8A:
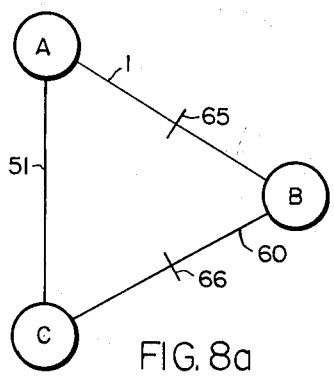
FIG. 8a is a further simplified schematic thereof.
Figure 8:
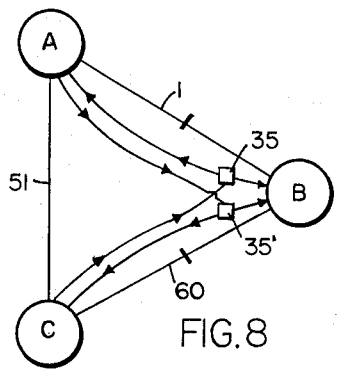
FIG. 8 is a simplified schematic thereof.

The arrangement of FIG. 7 may be indicated in more simplified or schematic form as in FIG. 8. This figure shows a cost comparison between A and B and similarly between C and B. For the comparison that is used between A and B a signal is generated to act upon the net interchange schedules of A and B in an equal but opposite manner. Similarly, the cost comparison that is made between C and B is used to generate a signal that modifies the net interchange schedules of C and B by equal but opposite amounts. In the schematic drawing the arrows indicate that the net interchange schedule of A is modified by comparison AB. Similarly, the net interchange of C is modified only by comparison CB. The net interchange schedule of B is modified by both comparisons AB plus CB. At each instant the system meets the requirement that the sum of all interchange schedules remain equal to zero.

Figure 9:
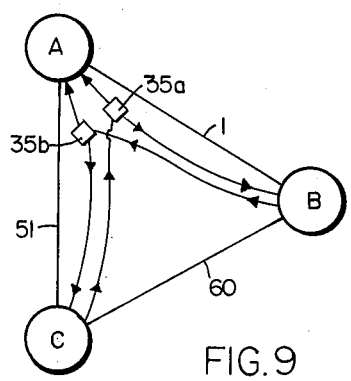
FIGS. 9–11 represent alternate computer control arrangements suitable for use in a three area power pool of the type shown in FIG. 7.

FIG. 9 illustrates an alternate arrangement for the equipment of FIG. 8 in which area A is used as the reference area with the incremental cost comparisons being made between areas A and B, and A and C, respectively, by comparison equipment 35a and 35b.

Figure 10:
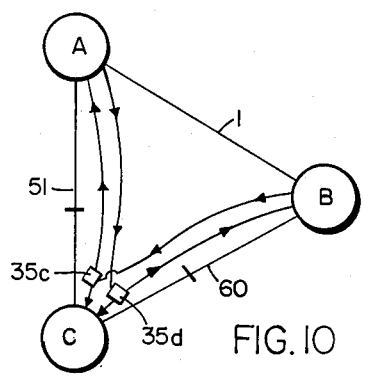

FIG. 10 illustrates another alternate arrangement for the equipment of FIG. 8 in which area C is used as the reference area with the incremental cost comparisons being made by comparison equipment 35c and 35d between areas C and A, and C and B, respectively.

Figure 11:
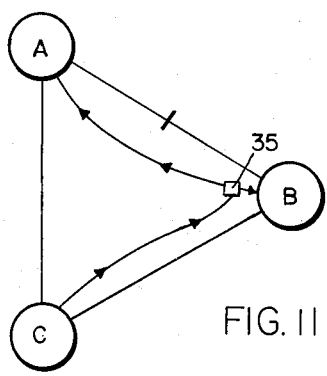

For the general case in which there are $n$ companies in the pool, $n-1$ independent cost comparisons are required. It is possible for any given areas to operate at a manually set arbitrary net interchange and have the remaining areas operated in the most economic manner. For example, consider a three area pool of the type shown in FIG. 7. Assume that area C wishes to operate manually according to an arbitrary net interchange schedule of magnitude $P_{ec}$. The arrangement of control equipment is indicated in FIG. 11. For proper operation it is necessary only that the net interchange setting of area C be equal to the sum of the net interchange settings of the controllers in areas A and B.

FIG. 8 may be indicated in a more simplified form as shown in FIG. 8a. Referring to FIG. 8a, it is seen that the incremental cost comparison between areas A and B has been schematically indicated by the transverse line 65 on ties 1 while the incremental cost comparison between areas B and C has been indicated by the transverse line 66 on ties 60.

Using schematic representation similar to that of FIG. 8a, reference may be had to FIGS. 12–16 which illustrate integrated power transmission systems or pools having four areas A, B, C, and D with ties interconnecting each area with every other area. Ties 71 directly interconnect areas A and B, ties 72 directly interconnect areas B and C, ties 73 directly interconnect areas C and D, ties 74 directly interconnect areas A and D, ties 75 directly interconnect areas A and C, and ties 76 directly interconnect areas B and D. For four areas $n-1=3$. The three incremental cost comparisons required include each local system at least once and may be made as in FIG. 12 between A and B, B and C, and C and D. The comparison equipment could be conveniently located only at areas B and C, or at areas A, B, and C.

Figure 13:
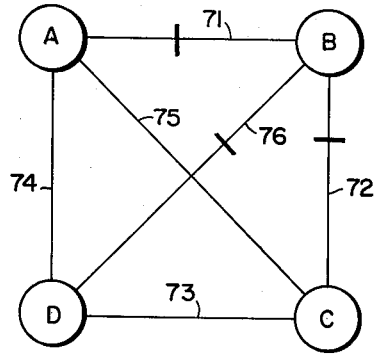
Figure 14:
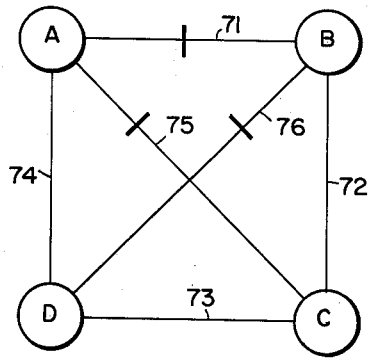
Figure 15:
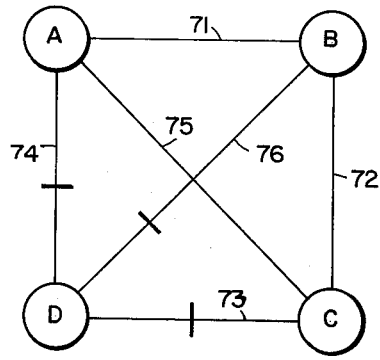

FIGS. 13–15 illustrate a few of the alternate arrangements of equipment which may be used in a four area pool.

Figure 16:
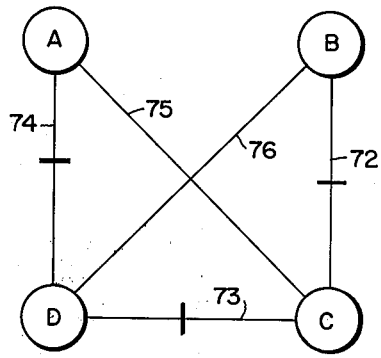

FIG. 16 illustrates that the necessary cost comparisons may be accomplished even in systems having particular areas, for example, areas A and B which are not directly interconnected by ties.

Figure 12:
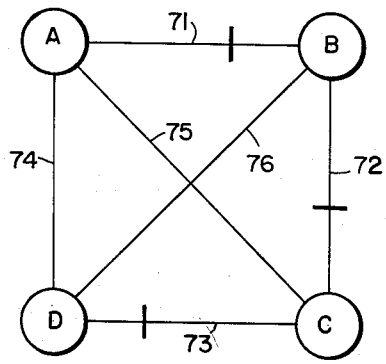
FIGS. 12–16 illustrate various alternate ways of utilizing the invention in a four area power pool.
Figure 12A:
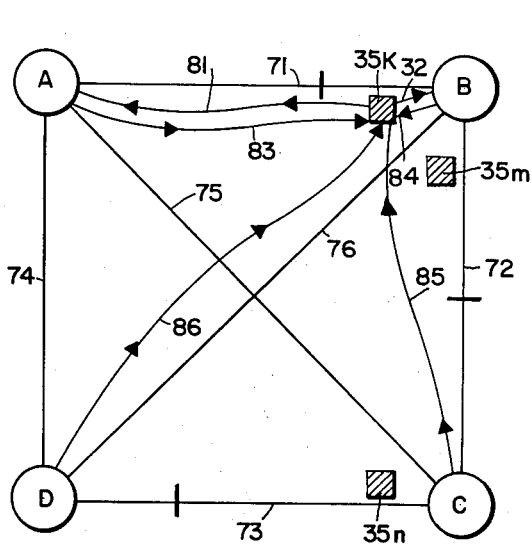

FIG. 12a illustrates an arrangement of the comparison equipment required for the system of FIG. 12 and the signals provided for and by such comparison equipment. The figure is in the semi-simplified schematic form of FIG. 8. Comparison equipment 35k accomplishes the incremental cost comparison between areas A and B, respectively. Incremental cost signals 83, 84, 85, and 86 are provided to the comparer by the automatic dispatching systems of areas A, B, C, and D, respectively. The inputs and outputs of comparers 35m and 35n, which compare the incremental cost between areas B and C, and C and D, respectively, have been omitted for purposes of simplicity and clarity in FIG. 12a.

COMPUTER CONTROLLER EQUIPMENT

Figure 17:
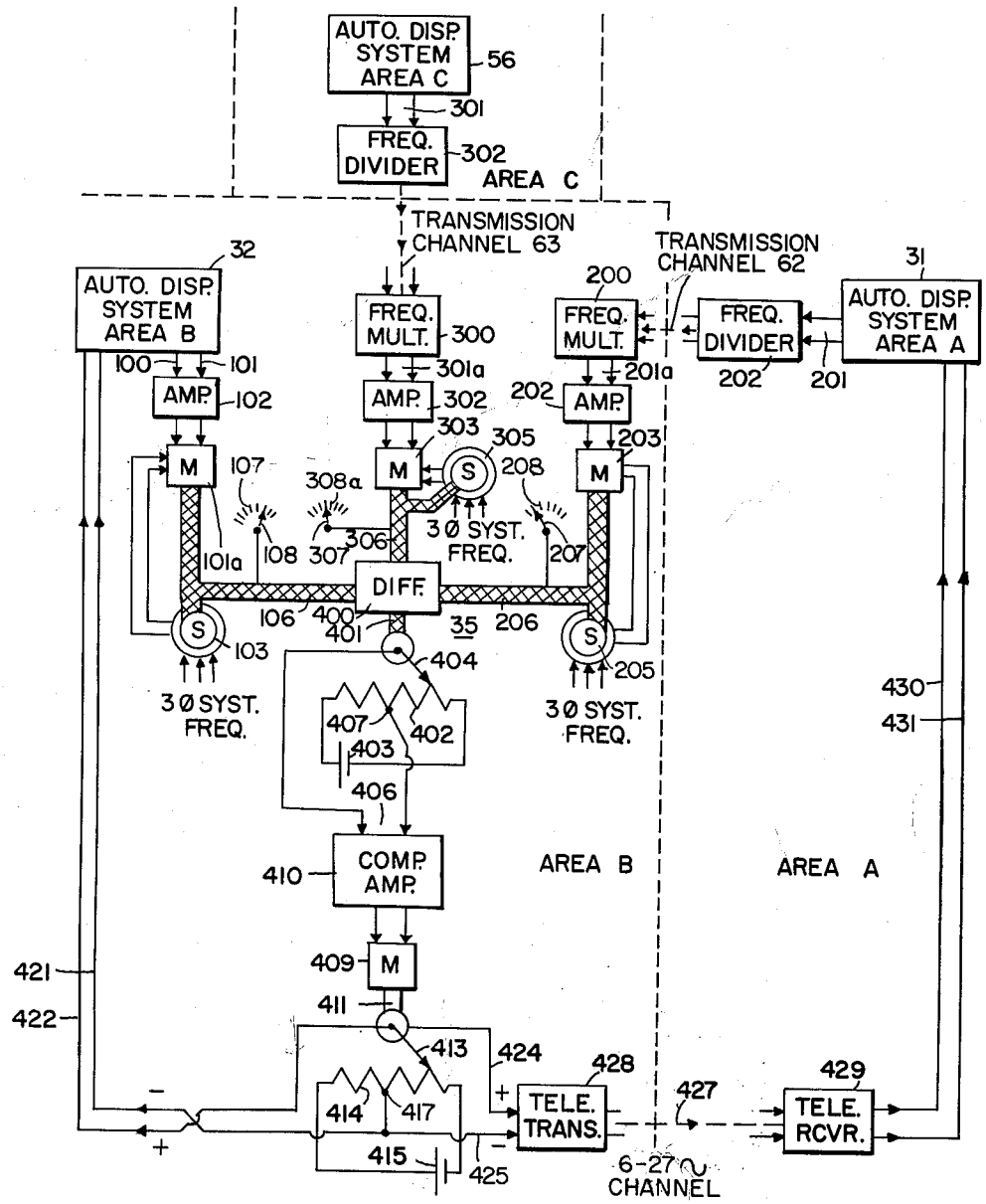
FIG. 17 is a schematic diagram of the equipment suitable for use in the comparer shown in block diagram form in FIG. 2.

Comparison equipment of the type discussed above and the use thereof in an automatic integrated power transmission system is shown in FIG. 17. FIG. 17 shows a control equipment for a three area pool and is illustrative of the general case of three or more interconnected areas. The comparison equipment is of the general type shown in FIG. 2 and provides an incremental cost comparison between two areas, A and B, such as is accomplished by comparison equipment 35 of FIG. 7 or 35k of FIG. 12a.

Referring to FIG. 17, the automatic dispatching system equipment 32 of area B provides an incremental cost signal for area B on lines 100 and 101. The ADS equipment 32 may be of the type described in the aforementioned Kirchmayer Patent 2,839,692 and/or described in chapter 2 of the Kirchmayer textbook Economic Control of Interconnected Systems.

The incremental cost signal from ADS equipment 32 of area B, as defined by Equation 28, may be utilized to drive an electric motor 101a after amplification thereof by a suitable conventional amplifier 102. The motor 101 is of the two phase servo motor type and rotates in accordance with the phase difference of the inputs thereof, one input being provided by amplifier 102 and the other being provided by the rotor of selsyn 103. The stator of selsyn 103 is excited from the three phase power system lines. The rotation of motor 101a is zero for equal input signals and for other conditions the speed and direction of the rotation is proportional to the signal provided by the automatic dispatching equipment 32. Thus, the motor selsyn unit 101a, 103 provides an angular position of the motor output shaft 106 which represents the incremental cost of power $C_{b-a}$ of area B at the comparison point. The cost signal $C_{b-a}$ of area B may be indicated on scale 107 by pointer 108 driven by the motor output shaft 106 through appropriate gearing (not shown).

Similarly, the automatic dispatching system equipment 31 of area A provides a cost of power signal 201 for area A corresponding to the first two terms of Equation 27. Since the comparison equipment 35 is located at area B in accordance with the location of equipment set forth in FIG. 7, the cost of power signal 201 of area A is sent over suitable communication channels to area B. The communication channel equipment may conveniently include a frequency telemetering arrangement of the general type utilized between the ADS equipment and generating stations of the power control system described in the aforementioned Kirchmayer Patent 2,839,692. With such telemetering equipment the cost of power signal 201 is provided as a signal, the cumulative phase angle of which varies in accordance with the cost of power. The signal 201 is supplied to a frequency divider 202 to reduce the signal frequency to make it more suitable for transmission. The signal is then transmitted to the comparison equipment 35 at area B by carrier current transmission or other conventional means such as leased wire, micro wave transmission, etc. For example, the transmission channel 62 may be of the type described in U.S. Patent 2,701,329, issued February 1, 1955, to E. E. Lynch and G. S. Lunge, and assigned to the same assignee as the present invention.

The cost signal sent to area B is received by suitable means such as a carrier current receiver (not shown) and its original frequency is restored by a frequency multiplier 200. Thus, the output 201a of the frequency multiplier 200 is once again the cost control signal having a cumulative phase angle which varies in accordance with the cost of power for area A at the comparison point. The signal 201a is amplified by amplifier 202 which in turn provides an input to the two phase motor 203. In a manner similar to the motor selsyn unit 103, 101a of the area B cost equipment described above, the selsyn 205 has its stator excited by the three phase line and the rotor is connected to the motor 203 to provide rotation of the motor in accordance with the cost signal of area A. The angular position of the output shaft 206 of the motor 203 thus is in accordance with the incremental cost of power of area A as defined by the first two terms of Equation 27.

The cost signal $$C_{a-b} - \sum_{k}\left(\lambda_c \frac{\partial L_{Tc}}{\partial P_{ck}}\right)\frac{\partial P_{ck}}{\partial P_{ea}}$$

of area A may be indicated by pointer 207 in cooperation with scale 208 by connecting the pointer to shaft 206 through appropriate gearing (not shown).

An incremental wheeling cost signal of area C, as indicated by the last term of Equation 27, is developed in area C and also set to the comparison equipment 35. This signal is developed and transmitted over a communication channel to area B in a manner similar to that for signal 201 of area A. The automatic dispatching system equipment 56 provides a signal 301 representing the wheeling cost signal $$\sum_k \left( \lambda_c \frac{\partial L_{Tc}}{\partial P_{ck}} \right) \frac{\partial P_{ck}}{\partial P_{ea}}$$

the frequency of which is reduced for ease of transmission by frequency divider 302 and transmitted via transmission channel 63 to area B. The transmitted signal is received by a suitable receiver (not shown) and the original frequency is restored by a frequency multiplier 300 to provide signal 301a, a cost control signal having a phase angle which varies in accordance with the incremental wheeling cost of power of area C. The wheeling cost signal 301a is then amplified by amplifier 302 and utilized to provide a rotation of motor 303 in accordance therewith through the action of the motor selsyn unit 303, 305. The output shaft 306 of motor 303 thus rotates in accordance with the incremental wheeling cost signal of area C. The incremental wheeling cost of area C may be visually indicated by pointer 307 driven by shaft 306 through suitable gearing (not shown) in cooperation with suitably calibrated scale 308.

Thus, the appropriate cost signals of areas A, B, and C are represented in comparer 35 by the rotation of shafts 206, 106, and 306, respectively. These rotations may be converted to electrical signals and then combined or compared, or may be mechanically combined in the manner shown in FIG. 17. In FIG. 17 the three input mechanical differential 400 provides an output shaft 401 rotation the direction and magnitude of which is proportional to the difference $C_{a-b} - C_{b-a}$. The rotation of shaft 401 is utilized to provide an electrical signal proportional to the cost difference through a potentiometer battery combination. Potentiometer 402 is electrically connected in shunt with battery 403. The slider or wiper 404 of the potentiometer 402 is mechanically coupled to shaft 401 for movement therewith. A direct current signal 406 proportional to the incremental cost differential $C_{a-b} - C_{b-a}$ is thus provided between the slider 404 and tap 407 of potentiometer 402.

The cost differential signal 406 is utilized to energize a slow speed servo motor 409 through comparing amplifier 410. The details of comparing amplifier 410 are described below in connection with FIG. 18. The rotation of shaft 411 of servo motor 409 is utilized to drive the slider or wiper 413 of the shunt connected potentiometer 414 and battery or other source of voltage 415.

The direct current signal output of the potentiometer 414 battery 415 combination is taken between slider 413 and tap 417 of the potentiometer and represents the integral with respect to time of the cost differential signal 406. This net interchange modifying signal is fed back with appropriate polarity to the automatic dispatching system equipment 32 of area B via leads 421 and 422. It is utilized to supplement or modify the existing net interchange signal set up in the ADS equipment 32.

Similarly, the equal but opposite polarity net interchange signal developed across leads 424 and 425 is sent to the automatic dispatching system equipment 31 of area A to supplement to the existing net interchange schedule signal set up therein. However, since the ADS equipment 31 is remotely located at area A the signal across leads 424 and 425 may be sent via a communication channel 427 including a telemeter transmitter 428 at area B and a telemeter receiver 429 at area A which reproduces the incremental net interchange signal across leads 430 and 431.

In operation, if for example, the incremental cost $C_{b-a}$ is higher than $C_{a-b}$, motor selsyn units 101a, 103; 203, 205; and 303, 305 will cause the potentiometer slider 413 to move in the direction which will send a reduce "out schedule" signal to area B on lines 421, 422 and an increase "out schedule" signal to area A via the telemeter channel 427. The resultant control action is of a reset nature; that is, the interchange signals will continue to change until the condition of cost equality from the two areas at the comparison point is made.

The comparison equipment 35', which per FIG. 7 may be also physically located in area B, will be essentially the same as comparison equipment 35 but will compare the cost of power of areas B and C.

Figure 18:
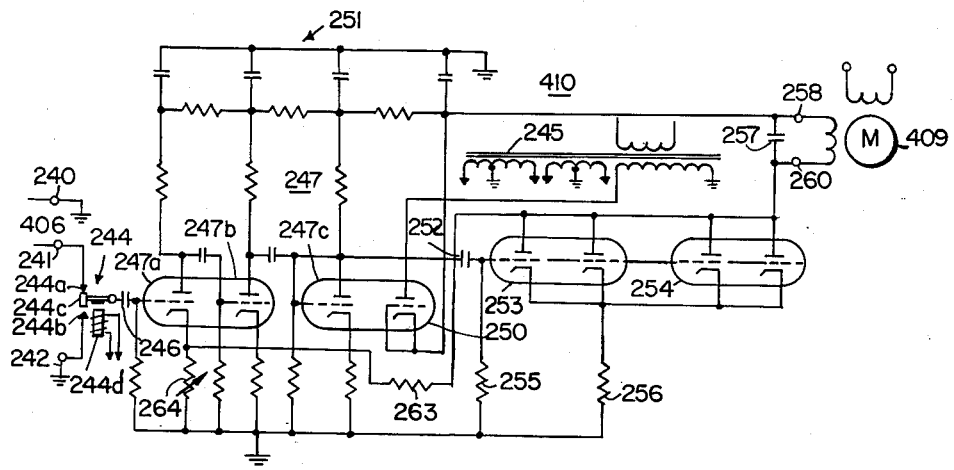
FIG. 18 is a schematic illustrating the details of the comparing amplifier shown in block diagram form in FIG. 17.

FIG. 18 is a schematic representation of the details of the comparison amplifier 410. This amplifier is similar in certain respects to that described in U.S. Patent 2,753,505, granted July 3, 1956 on application Ser. No. 395,117 to John J. Larew and Kenneth N. Burnett and assigned to the same assignee as the present invention. Reference may be had to that application for a detailed explanation of certain of the basic operational concepts.

Referring to FIG. 18, the direct current signal 406 is supplied between the terminals 240 and 241 while the terminal 242 is grounded. The terminals 241 and 242 are respectively connected to the two fixed contacts 244a and 244b of a conventional chopper 244 having a movable or vibrating contact 244c. The energizing coil 244d of the chopper may be connected to a secondary winding of a transformer 245 whose primary winding is connected to the system power lines. The movable contact 244c of the chopper is switched in the conventional manner between the fixed contacts 244a and 244b at the frequency of the voltage that energizes the operating winding 244d.

The movable contact 244c of the chopper is connected through a coupling capacitor 246 to the control grid of the first stage of a conventional three stage amplifier 247 comprising triode electron discharge devices 247a, 247b, 247c.

During one-half of each cycle of the energizing alternating current supplied to the operating winding 244d of the chopper, the signal supplied to the control grid of the first stage 247a of the amplifier 247 is the signal 406 supplied between terminals 240 and 241, while during the other half cycle the input to the amplifier 247 is grounded by the movable contact 244c being connected to grounded terminal 242. Thus, the input signal 406 is, in effect, compared with ground and the amplitude and phase of the alternating current square-wave signal present on the control grid of the first stage 247a of the amplifier 247 will depend on the amplitude and polarity of the signal 406 relative to ground.

Anode voltages may be supplied to the three stage amplifier 247 by a half-wave rectifier 250 energized from a secondary winding on transformer 245. The direct voltage output of the rectifier 250 is filtered by a conventional resistance-capacitance filter network 251 before being supplied to the anodes of the amplifier stages 247a, 247b, 247c.

The square-wave output signal from the third stage 247c of amplifier 247 is connected through a coupling capacitor 252 to the control grids of a pair of duo-triode electron discharge devices 253 and 254 provided with a grid resistor 255. The anodes of the duo-triode 253 and the anodes of duo-triode 254 are connected together to B+ through the output terminals 258 and 260. The cathodes of the duo-triodes 253 and 254 are provided with a common cathode resistor 256. A capacitor 257 is connected across the output terminals 258 and 260.

The alternating current signal supplied to the control grids of the duo-triodes 253 and 254 is either in phase with or out of phase with one phase of the two phase reversible motor 409 connected to the source that energizes the primary winding of transformer 245 to cause the motor to rotate in one direction or the other. Of course, the direction in which the motor rotates is determined by the polarity of the input signal connected between terminals 240 and 241 and its speed of rotation is related to the amplitude thereof. When there is no input signal 401 the motor does not rotate.

Negative feedback is provided by connecting the plates of duo-triodes 253 and 254 through resistor 263 to the cathode of the first stage 247a of amplifier 247. A variable resistor 264 is connected between the cathode of amplifier stage 247a and ground to control the feedback. This arrangement provides negative feedback to provide a degree of proportionality between motor 409 speed and input signal.

Figure 19:
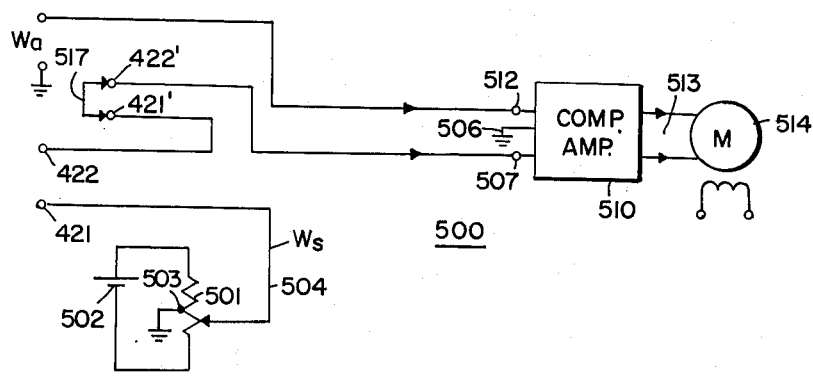
FIG. 19 is a diagram of the utilization of the modifying interchange signal developed by the comparer of FIG. 17 by the automatic dispatching system equipment.

The use of the net interchange signals, provided by the potentiometer 414, battery 415 combination of FIG. 17 to supplement or modify the existing interchange signals in the automatic dispatching system equipments of the two areas being compared by each comparison equipment 35 or 35', may be accomplished by the arrangement shown in FIG. 19.

Referring to FIG. 19, a portion of the automatic dispatching equipment 32 of area B is shown. Similar equipment would, of course, be associated with the ADS equipment 31 of area A. In accordance with the teachings of the aforementioned Kirchmayer Patent 2,839,692, a tie line controller is provided in the ADS equipment which receives a direct current signal $\omega_a$ proportional to actual tie line load, compares it to a signal $\omega_s$ provided within itself proportional to desired or scheduled tie line load, and causes an output which may be rotation of an output shaft at a speed proportional to the difference $\Delta\omega$. The controller may be of the type described in the aforementioned Larew and Burnett Patent 2,753,505.

The scheduled load or power interchange is manually set up according to predetermined schedules based on contracts and/or anticipated load demands between the interconnected areas by adjustment of potentiometer 501. The potentiometer is shunted by a battery 502 and has a grounded tap 503 to provide an adjustable direct current voltage $\omega_s$ between the grounded tap and the wiper 504. Instead of feeding $\omega_s$ directly to one input between grounded terminal 506 and terminal 507 of the comparing amplifier, the $\omega_s$ signal is connected in series with the lines 421 and 422 of FIG. 17 which provide the modifying net interchange signal output of the comparer 35 to automatically supplement or offset the signal $\omega_s$ in accordance with the economic considerations discussed above.

The signal $\omega_a$ is fed to the other input of the comparing amplifier 510 between terminals 596 and 512. The comparing amplifier in accordance with the detailed discussion in the aforementioned Larew and Burnett Patent 2,753,-505 causes rotation of motor 514 and consequent generator control in response to the combined loading schedule signal 513.

In FIG. 17 there are three interconnected areas A, B, and C with cost comparisons being made between areas A and B, and B and C. Area B would therefore be provided with two net interchange signals, one from the comparer 35 and the other from the comparer 35'. The second net interchange signal may be introduced by removing the jumper 517 between the terminals 421' and 422' in series with the line leading from terminal 422 to terminal 507 of the comparing amplifier. The modifying interchange signal from area C provided by comparison equipment 35' through the comparison of areas B and C is introduced at terminals 421' and 422'. Thus, in the reference system B, two modifying net interchange signals are combined with the scheduled interchange signal $\omega_s$. In area A the arrangement corresponding to FIG. 19 would utilize the jumper 517 since only one modifying interchange signal need be combined with the scheduled interchange signal $\omega_s$.

Figure 20:
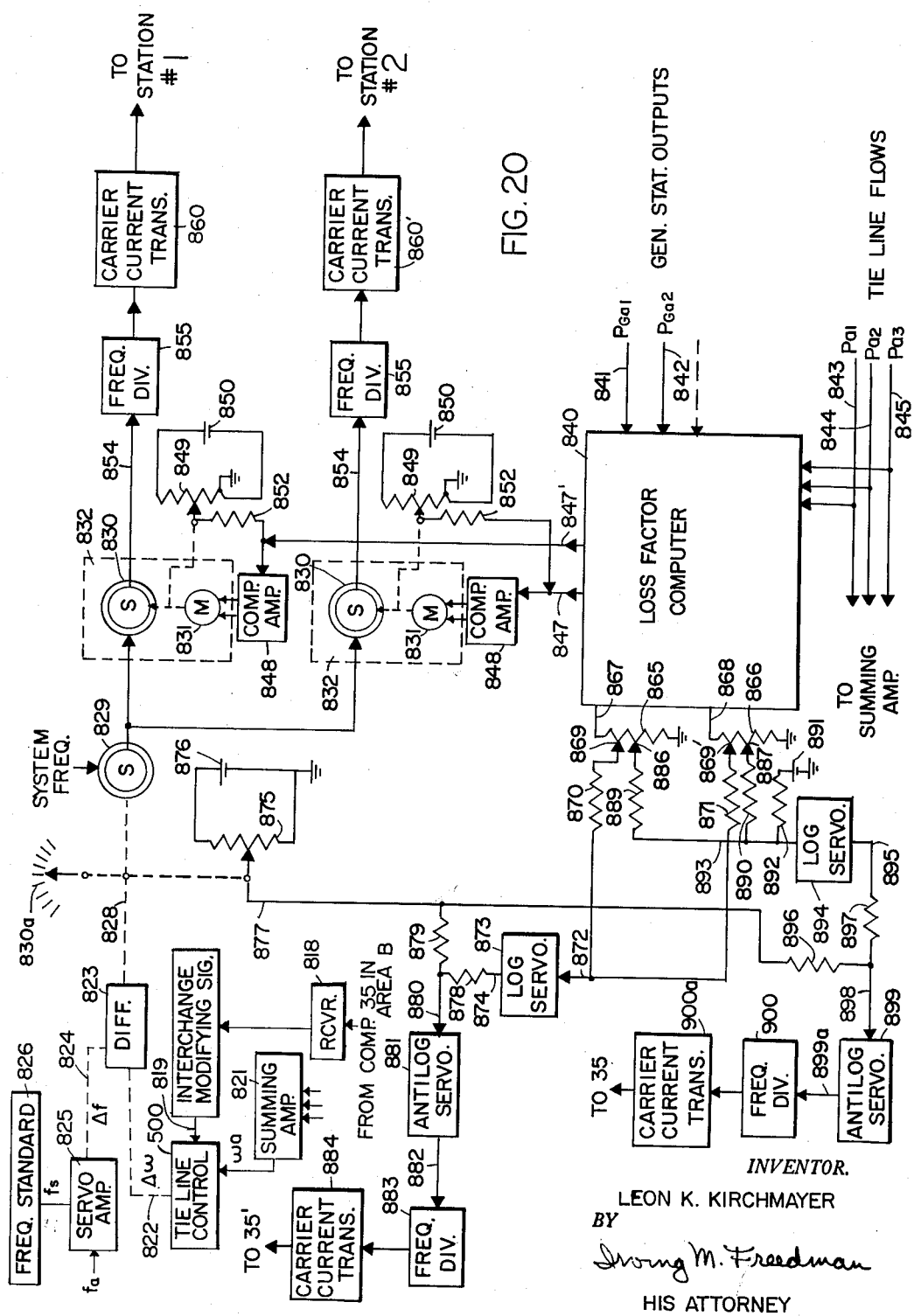
FIG. 20 is a schematic, portions of which are shown in simplified block diagram form illustrating the development of the incremental cost and incremental wheeling cost signals for use in the comparer of FIG. 17.

FIG. 20 shows portions of the automatic dispatching system equipment 31 in area A to illustrate the production and utilization of the incremental power cost and net interchange signals for one area of the pool. A detailed discussion of the arrangement and operation of complete ADS equipment of this type may be found in the aforementioned Kirchmayer Patent 2,839,692, and chapter 2 of the aforementioned textbook, Economic Control of Interconnected Systems. Reference may be had to these sources for a more detailed discussion than the following of the prior art portions of FIG. 20.

Referring to FIG. 20, the local system or area A automatic dispatching system equipment 31 controls economically and automatically the generation of the local power area in response to changes in the frequency and/or tie line load. For control in response to both frequency and load, the system includes two primary detectors, one for detecting deviation of the local system frequency from a desired value, and one for detecting the tie line load deviation from its prescheduled value, both forming part of the central control station equipment of the local system A. The means for detecting the deviation of the actual tie line load from the prescheduled value, as modified by the interchange signals from comparer 35 in area B, comprises a tie line load controller 500, described in detail above in regard to FIG. 19, and a conventional summing amplifier 821. The input signals to the summing amplifier 821 are supplied from conventional telemeter receivers or the like (not shown), such as are available commercially, which provide signals proportional to the actual loads on the tie line means interconnecting the local area with one or more remote areas. The summing amplifier 821 sums the various load signals and provides the tie line load controller 500 with a signal $\omega_a$ proportional to the actual tie line load.

Briefly, the tie line load controller 500 compares the signal $\omega_a$ received from the summing amplifier 821 with another signal which comprises the scheduled load signal $\omega_s$, which is produced within the tie line load controller, and whose value may be made proportional to the prescheduled value of tie line load, and the modifying interchange power signal 819 received by receiver 818 from comparison equipment 35 in area B which compares the power costs of interchanging power between areas A and B. Since area A in FIGS. 7 and 17 receives only one modifying interchange power signal, the jumper 517 in FIG. 19 will be utilized and the modifying signal will be provided between terminals 421 and 422. The comparison amplifier 510 within the tie line controller 500 of FIG. 20 produces rotation of an output shaft 822 at a speed and direction proportional to the comparison of $\omega_a$ and the combined signals, $\omega_s$ and the modifying interchange signal.

The output shaft 822 is connected to one input of a conventional mechanical differential 823, whose other input is connected to a shaft 824. The shaft 824 is the output shaft of a servo amplifier 825 which, with a frequency standard 826, comprises means for detecting the system frequency deviation from the standard or desired frequency. The output of the frequency standard 826 is a signal having frequency $f_s$ and is supplied to one input of the servo amplifier 825, with the other input of amplifier 825 being supplied from the system power line having frequency $f_a$.

The frequency standard 826 may be of any conventional well known type, such as an oscillator whose frequency is controlled by a tuning fork or a crystal, and its principal requirements are that it provide an output signal of sufficient amplitude to drive the servo amplifier 825 with a frequency which is constant to the degree required by electric utility power generation systems.

The servo amplifier 825 may be one of several known designs. One servo amplifier, which is known to be suitable for this use, is described in U.S. Patent No. 2,856,523, granted October 14, 1958, on application Serial No. 395,119, filed November 30, 1953, by J. J. Larew and C. E. James, and assigned to the same assignee as the present invention. Briefly, the servo amplifier 825 compares the frequencies or phases of the two input signals and causes output shaft 824 to rotate at a speed proportional to the frequency or phase difference between the two signals and in a direction determined by the polarity of the difference.

As was previously mentioned, the signal supplied to the servo amplifier 825 from the system power line has the actual system $f_a$, and the signal supplied thereto from the frequency standard 826 has the standard frequency $f_s$. Therefore, when the two input signals are compared in the servo amplifier and the shaft 824 is caused to rotate at a speed proportional to the frequency difference, the shaft rotates at a speed proportional to $\Delta f$. The tie line load controller 500 and the servo amplifier 825 are so arranged that the differential 823 adds together the $\Delta f$ and $k\Delta\omega$ signals when the actual tie line load from the local to remote areas is greater than the scheduled load and the actual system frequency $f_a$ is higher than the standard frequency $f_s$.

The output shaft 828 of the differential 823, which is rotating at a speed which is proportional to $(\Delta f + k\Delta\omega)$, is connected to the rotor of a differential selsyn 829. The shaft 828 may also be connected through appropriate gearing (not shown) to an indicator 830a calibrated in terms of incremental cost level $\lambda_a$.

The construction, characteristics, and method of operation of differential selsyns are well known in the art, and need not be described in detail. It is believed sufficient to point out that when the stator winding of a differential selsyn is energized by a three-phase voltage, the frequency of the three-phase voltage induced in the rotor winding is equal to the frequency of the voltage on the stator plus or minus the speed of rotation of the rotor. For example, if the stator winding is energized by a 60-cycle per second voltage and the rotor is turned at a speed of five cycles per second, the voltage induced in the rotor will have a frequency of either 55 cycles per second or 65 cycles per second, depending on the direction of rotation of the rotor. In the present case, the stator winding of the selsyn 829 is energized from the system power line having frequency $f_a$, and its rotor is rotated at a speed proportional to the signal $(\Delta f + k\Delta\omega)$. Therefore, the output of the rotor of the differential selsyn 829 has a frequency equal to $f_a$ plus the signal $(\Delta f + k\Delta\omega)$.

The rotor winding of the differential selsyn 829 on which the control signal appears is connected to the stator windings of a control transformer selsyn 830 whose rotor is mechanically connected to a reversible motor 831. The selsyn 830 and the motor 831 form a penalty factor unit 832, one such unit being provided at the central control station for each controlled generating station or alternatively for each controlled generator. For purposes of explanation, it will be assumed that a penalty factor unit is provided for each station. When motor 830 is energized by means to be hereafter described and the rotor of control transformer selsyn 829 rotated, the frequency of the station control signal induced in the rotor windings is increased or decreased from the frequency of the signal which energizes the stator winding of the selsyn. This is done in order to reapportion the load between the various controlled stations of the local network to account for the effect of transmission losses.

As is well known to those skilled in the power transmission art, definite losses occur in transmitting power from a generating station to a load. In order for optimum economic system operation to occur, it is necessary to evaluate those transmission losses so that generation may be properly allocated among the various stations comprising the local area or system A. The aforementioned Kirchmayer Patent 2,839,692 describes in detail the development and use of such loss signals in providing economic operation of the local system such as A.

Briefly however, such local system economic operation includes means for automatically energizing the motors 831 in the penalty factor units 832 to modify the control signal for the stations to cause generation by all stations of local system A at equal incremental costs of delivered power for each of the controlled generating stations.

The local system economic operation equipment for automatic operation may include a transmission loss factor computer 840 which receives signals such as 841 and 842 proportional to the power outputs of the local system generating stations, $P_{Ga_1}$ and $P_{Ga_2}$ and also signals such as 843, 844, and 845 proportional to the local system A tie line flows $P_{a1}$, $P_{a2}$, and $P_{a3}$. These signals may be obtained from conventional telemetering equipment. The loss factor computer 840 provides an output signal 847 and 847' for each controlled generating station of the local system. The output signals 847 and 847' are utilized to control the rotation of the reversible motor 831 through penalty factor servo systems including comparison amplifiers 848 and a feedback circuit including potentiometers 849 shunted by batteries 850 whose sliders are driven by the output shafts of motor 831. The feedback signals are provided from the sliders of the potentiometers 849 through resistors 852 to the inputs of the comparison amplifiers 848. The potentiometers 849 are logarithmically wound and the rotation of the shaft of motors 831 are proportional to the log input signals 847 and 847'. The output signals 854 of selsyns 830 represent the generating station economic control signals $$\frac{dF_{a_1}}{dP_{Ga_1}} \text{ and } \frac{dF_{a_2}}{dP_{Ga_2}}$$

which are reduced in frequency by frequency dividers 855 for ease of transmission by carrier current transmitters 860 and 860' to the generating stations number 1 and number 2, respectively, of local system A.

The loss factor computer 840 may also be utilized to provide the required local system A incremental power and incremental wheeling cost signals for use in the cost comparison equipments 35 and 35'. The loss factor computer 840 provides across resistors 865 and 866 a signal such as 867 and 868 for each tie line flow input which is proportional to $$\frac{\partial L_{T_a}}{\partial P_{a_1}}, \frac{\partial L_{T_a}}{\partial P_{a_2}}, \text{ etc.}$$

Taps 869 and 869' of resistors 865 and 866 are positioned in accordance with the predetermined $$\frac{\partial P_{a_1}}{\partial P_{ec}} \text{ and } \frac{\partial P_{a_2}}{\partial P_{ec}}$$

respectively.

The signals provided by the resistors 865 and 866 are summed in the network including resistors 870 and 871 to provide the signal 872 proportional to $$\sum_i \left(\frac{\partial L_{T_a}}{\partial P_{ai}}\right)\left(\frac{\partial P_{ai}}{\partial P_{ec}}\right)$$

The signal 872 is converted to logarithmic form by a conventional log servo 873. The details of a suitable log servo are shown and described in regard to FIG. 21 and it is sufficient to state at this time that the output 874 is a direct current signal proportional to the logarithm of the direct current input signal 872.

The output of differential 823 is proportional to log $\lambda_a$ and a direct current signal proportional to the log of $\lambda_a$ is provided by connecting the output shaft 828 to the slider of potentiometer 875 which is shunted by battery 876. The direct current output signal 877 taken between the tap of potentiometer 875 and the grounded end thereof is proportional to log $\lambda_a$ which is combined with the log signal 874 in the network including resistors 878 and 879 to provide a signal 880 which is proportional to the log $$\sum_i \lambda_a \left(\frac{\partial L_{T_a}}{\partial P_{ai}}\right)\left(\frac{\partial P_{ai}}{\partial P_{ec}}\right)$$

Figure 22:
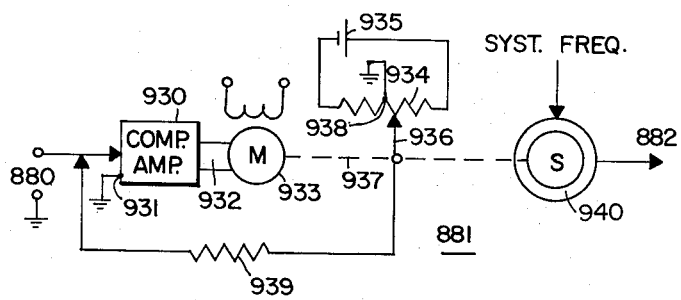

The log signal 880 is converted to a variable phase output signal by the conventional antilog servo 881 which is shown and described in more detail in regard to FIG. 22.

It is sufficient at this time to note the phase of the output signal 882 of the antilog servo 881 is proportional to the incremental wheeling cost of local system A for wheeling power between local systems B and C. The signal 882 is reduced in frequency by the frequency divider 883 and transmitted by carrier current transmitter 884 to the comparison equipment 35' at area B.

The incremental power cost signal $$\lambda_a + \sum_i \lambda_a \left(\frac{\partial L_{Ta}}{\partial P_{ai}}\right)\left(\frac{\partial P_{ai}}{\partial P_{ea}}\right)$$

of area A for use in the cost comparison between areas A and B by comparison equipment 35 is developed as follows. The adjustable taps 886 and 887 of resistors 865 and 866 in the output of the loss factor computer 840 are positioned in accordance with $$\frac{\partial P_{a1}}{\partial P_{ea}} \text{ and } \frac{\partial P_{a2}}{\partial P_{ea}}$$

respectively. As discussed above, the loss factor computer output signals 867 and 868 which are impressed across resistors 865 and 866 are proportional to $$\frac{\partial L_{Ta}}{\partial P_{a1}} \text{ and } \frac{\partial L_{Ta}}{\partial P_{a2}}$$

respectively. The taps 886 and 887 are connected to a combining network including resistors 889 and 890, respectively, and a unity value battery 891 in series with a resistor 892 to provide a signal 893 which is proportional to $$1 + \sum_i \left(\frac{\partial L_{Ta}}{\partial P_{ai}}\right)\left(\frac{\partial P_{ai}}{\partial P_{ea}}\right)$$

The signal 893 is fed through log servo 894 to provide a direct current signal 895 which is proportional to the log of signal 893 and which is combined in the network including resistors 896 and 897 with the direct current signal 877, discussed above, which varies as the log of $\lambda_a$. The combined signal 898 is converted by the antilog servo 899 to an output signal 899a, the phase or frequency of which varies as signal 898 and which is proportional to the incremental power cost signal of area A. This incremental cost signal is sent via frequency divider 900 and carrier current transmitter 900a to the comparison equipment 35 in area B for use in the cost comparison between areas A and B.

Figure 21:
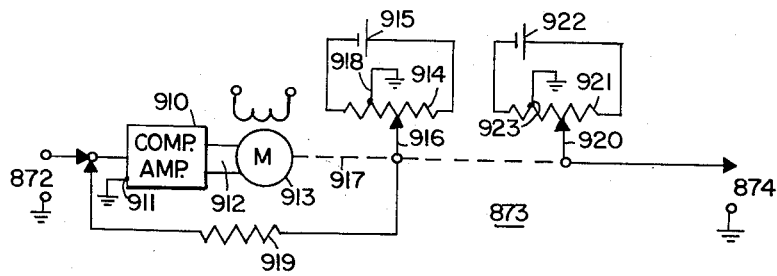
FIGS. 21 and 22 show the details of log and antilog servo systems suitable for use in the equipment of FIG. 20.

FIG. 21 shows in schematic form a logarithmic or log servo suitable for use as those indicated by blocks 873 and 894 in FIG. 20. Referring to FIG. 21, the log servo 873 is shown having a direct current input signal 872 which is utilized as one input of comparing amplifier 910. The other input 911 of the comparing amplifier is grounded. The output signal 912 of the comparing amplifier varies as the difference between the inputs and is utilized to drive reversible motor 913 in accordance therewith. Reference may be had to the discussion above in regard to FIG. 18 and the references cited therein for a more detailed explanation of the comparing amplifier.

A feedback signal is provided for the comparing amplifier 910 by the logarithmically wound potentiometer 914 in shunt with battery 915 and having the slider 916 thereof rotated by the output shaft 917 of the motor 913. The direct current signal developed between the slider 916 and the grounded tap 918 is fed back to the amplifier input through resistor 919.

The output shaft 917 of motor 913 is also utilized to drive the slider 920 of the linear wound potentiometer 921 which is shunted by battery 922. The direct current output signal 874 developed between the slider 920 and the grounded tap 923 of potentiometer 921 is proportional to the logarithm of the direct current input signal 872.

An antilogarithm or antilog servo suitable for use in those indicated by blocks 881 and 899 of FIG. 20 is shown in FIG. 22. Referring to FIG. 22, the antilog servo 881 is shown having a direct current input signal 880 as one input of hte comparing amplifier. The other input 931 of the comparing amplifier 930 is grounded. The output signal 932 of the comparing amplifier varies as the difference between the inputs and is utilized to drive reversible motor 913 in accordance therewith. In a manner similar to the initial portions of the log servo 873 of FIG. 21, a feedback signal is provided for the comparing amplifier 930 by the potentiometer 934 in shunt with battery 935 and having the slider 936 rotated by the output shaft 937 of the motor 933. The direct current signal developed between the slider 936 and the grounded tap 938 is fed back to the amplifier input through resistor 939. However, the potentiometer 934 is an antilog potentiometer.

The output shaft 937 of motor 933 is also coupled to the rotor of selsyn 940. The selsyn 940 is excited by the system line frequency.

Figure 23:
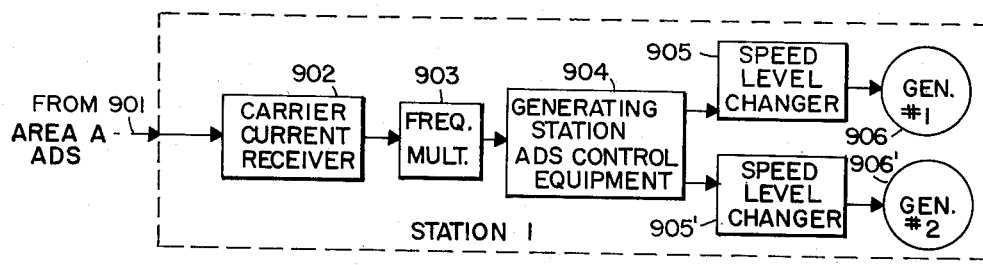
FIG. 23 is a simplified block diagram of the control equipment at generating stations within each local power system.

FIG. 23 shows in simplified block diagram form the equipment generating stations within each local power system. Referring to FIG. 23, station 1 of local system or area A receives its station control signal 901 from the communication channel including carrier current transmitter 860. This signal is developed by the ADS equipment 31 in the manner described above in regard to FIG. 20. The station No. 1 signal 901 is received by carrier current receiver 902 and the frequency thereof is converted back to that provided by the station 1 penalty factor unit within the local system ADS equipment 31. The signal output from the frequency multiplier 903 is then utilized in the station No. 1 ADS control equipment 904 to provide control signals for the speed level changers 905 and 905' to vary the generation of the generating units 906 and 906', respectively, to that required. In accordance with the aforementioned Kirchmayer Patent 2,839,692, the generating station ADS control equipment 904 will include circuitry to factor in the differences of power generating costs of generators 506 and 506' to provide generation within the station at equal incremental costs of generated power. Reference may be had to Kirchmayer Patent 2,839,692 for a detailed description of the arrangement and operation of the station equipment 904.

The incremental cost and wheeling signals, if desired, could be developed and the portions thereof combined in terms of direct current signal voltages. These direct current signals may be telemetered to the appropriate cost comparison equipments and combined in the manner already indicated in the discussion of FIG. 17 instead of utilizing the electro-mechanical arrangement described above.

As discussed above, the incremental cost signals for delivering power between a pair of local systems is combined in the comparison equipment for a given pair of local systems with the incremental wheeling cost of power signals from the other local systems of the integrated power transmission network. In certain circumstances the incremental wheeling cost from particular local systems may be neglected without unduly affecting the economic operation of the integrated system. For example, with reference to FIG. 16, local system A may be geographically at a great distance from relatively closely located local systems B, C, and D such that in the cost comparison between local systems C and D it may be feasible to use only the incremental wheeling power cost of system B and neglect the incremental wheeling costs of local system A. Thus, in an integrated power transmission system having a large plurality of interconnected local systems it may be feasible to omit the utilization of some of the incremental wheeling costs associated with the comparison of a particular pair of local systems because of relative distances, transmission losses, costs of generating power, or other economic considerations.

It is now apparent that the invention fulfills the objectives set forth and provides means for automatically and economically controlling the generation of an integrated power system. Generation of the local systems of the integrated system will be at equal incremental costs of delivered power. The invention enables the addition of more stations and systems to the network and during normal operation generators and/or stations may be added to or subtracted from the controlled integrated system without upsetting the control, and after such change, the system will quickly and automatically return to its proper generation output.

Therefore, while particular embodiments of the subject invention have been shown and described herein they are in the nature of description rather than limitation and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, each of said local power systems being included in at least one of said power cost comparisons, said cost comparison means receiving incremental cost signals from more than two power systems for delivering power between the two systems being compared by the associated cost comparison means, said comparison means providing modifying power interchange signals for each of the pair of local systems being compared thereby, means to transmit said modifying power interchange signals from each comparison means to the local systems being compared thereby, and means in each of the local power systems having associated cost comparison means to combine the respective modifying power interchange signal with a scheduled power interchange signal to modify the power interchange of said local power systems, and means to vary the generation of the generating stations within said pair of local power systems to cause generation of the integrated power system with the power interchange between said pair of local systems being based upon economic considerations.

2. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, each of said local power systems being included in at least one of said power cost comparisons, said cost comparison means receiving incremental cost signals from more than two power systems for delivering power between the two systems being compared by the associated cost comparison means, said comparison means providing modifying equal amplitude and opposite power interchange signals for each of the pair of local systems being compared thereby, means to transmit said modifying power interchange signals from each comparison means to the local systems being compared thereby, and means in each of the local power systems having associated cost comparison means to combine the respective modifying power interchange signal with a scheduled power interchange signal to modify the power interchange of said local power systems, and means to vary the generation of the generating stations within said pair of local power systems to cause generation of the integrated power system with the power interchange between said pair of local systems being based upon economic considerations.

3. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, each of said local power systems being included in at least one of said power cost comparisons, said cost comparison means receiving incremental cost signals from more than two power systems for delivering power between the two systems being compared by the associated cost comparison means, said comparison means providing modifying equal amplitude and opposite power interchange signals for each of the pair of local systems being compared thereby, means to transmit said modifying power interchange signals from each comparison means to the local systems being compared thereby, and means for each of the local power systems having associated cost comparison means to combine the respective modifying power interchange signal with a scheduled power interchange signal to modify the power interchange of said local power systems, and means to vary the generation of the generating stations within said pair of local power systems to cause generation of the integrated power system with the power interchange between said pair of local systems being at equal incremental costs of delivered power.

4. An electric power control system for controlling the generaiton of an integrated power transmission system having at least three interconnected local power generating systems, each local system including means to automatically control generation of the generating stations therein at equal incremental costs of delivered power within its respective local system comprising: tie lines interconnecting each of said local systems with at least one other of said local systems, means to provide incremental power cost comparisons between $n-1$ different pairs of local power systems, each of said local power systems being included in at least one of said power cost comparisons, said cost comparison means receiving incremental cost signals from more than two local power systems for delivering power between the two systems being compared by the associated cost comparison means, said comparison means providing modifying equal amplitude and opposite power interchange signals for each of the pair of local systems being compared thereby, means to transmit said modifying power interchange signals from each comparison means to the local systems being compared thereby, and means for each of the local power systems having associated cost comparison means to combine the respective modifying power interchange signal with a scheduled power interchange signal to modify the power interchange of said local power systems, and means to vary the generation of the generating stations within said pair of local power systems to cause economic generation of the integrated power system with the power interchange between said pair of local systems being at equal incremental costs of delivered power.

5. An electric power control system for controlling the generation of an integrated power transmission system having at least three interconnected local power generating systems, each local system including means to automatically control generation of the generating stations therein at equal incremental costs of delivered power within its respective local system comprising: tie lines interconnecting each of said local systems with at least one other of said local systems, means to provide incremental power cost comparisons between $n-1$ different pairs of local systems, each of said local power systems being included in at least one of said power cost comparisons, said cost comparison means receiving incremental cost signals from more than two power systems for delivering power between the two systems being compared by the associated cost comparison means, said comparison means providing modifying equal amplitude and opposite effect power interchange signals for each of the pair of local systems being compared thereby, means to transmit said modifying power interchange signals from each comparison means to the local systems being compared thereby, and means for each of the local power systems having associated cost comparison means to combine the respective modifying power interchange signal with a scheduled power interchange signal and a signal representing the actual power interchange to provide a resultant interchange signal, and means responsive to said resultant signal to modify the power interchange of said local power systems, and means to vary the generation of the generating stations within said pair of local power systems to cause economic generation of the integrated power system with the power interchange between said pair of local systems being at equal incremental costs of delivered power.

6. An electric power control system for controlling the generation of an integrated power transmission system having at least three interconnected local power generating systems, each local system including means to automatically control generation of the generating stations therein at equal incremental costs of delivered power within its respective local system comprising: at least one tie line interconnecting each of said local systems with at least one other of said local systems, means to provide incremental power cost comparisons between $n-1$ different pairs of local power systems, said cost comparison means receiving incremental cost signals from more than two power systems for delivering power between the two systems being compared by the associated cost comparison means, said comparison means providing modifying equal amplitude and opposite effect power interchange signals for each of the pair of local systems being compared thereby, means to transmit said modifying power interchange signals from each comparison means to the local systems being compared thereby, and means for each of the local power systems having associated cost comparison means to combine the respective modifying power interchange signal with a scheduled power interchange signal and a signal representing the actual power interchange to provide a resultant interchange signal, and means responsive to said resultant signal to modify the power interchange of said local power systems, and means to vary the generation of the generating stations within said pair of local power systems to cause economic generation of the integrated power system with the power interchange between said pair of local systems being at equal incremental costs of delivered power.

7. An electric power control system for controlling the generation of an integrated power transmission system having a plurality of interconnected local power generating systems, each local system including means to automatically control on an economic basis generation of the generating stations therein comprising: tie lines interconnecting each of said local systems with at least one other of said local systems, means to provide incremental power cost comparisons between $n-1$ different pairs of local power systems, said cost comparison means receiving incremental power cost signals from more than two local power systems for delivering power between the two systems being compared by the associated cost comparison means, said comparison means providing modifying power interchange signals for each of the pair of local systems being compared thereby, means to transmit said modifying power interchange signals from each comparison means to the local systems being compared thereby, and means for each of the local power systems having associated cost comparison means to combine the respective modifying power interchange signal with a scheduled power interchange signal to modify the power interchange of said local power systems, and means to vary the generation of the generating stations within said pair of local power systems to cause generation of the integrated power system with the power interchange between said pair of local systems being at equal incremental costs of delivered power.

8. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost power signal from at least one other system of said integrated system, said comparison means combining said incremental power and incremental wheeling cost signals and providing interchange power signals for each of said systems of the pair being compared, and means to vary the generation of said local systems in response to said interchange signals to provide power interchange based upon economic considerations.

9. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local power systems being compared thereby plus an incremental wheeling cost power signal from at least one other system of said integrated system, said comparison means combining said incremental power and incremental wheeling cost signals and providing opposite interchange power signals for each of said systems of the pair being compared, and means to vary the generation of said local systems in response to said interchange signals to provide power interchange based upon economic considerations.

10. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means combining said incremental power and incremental wheeling cost signals and providing opposite interchange power signals for each of said systems of the pair being compared, and means to vary the generation of said local systems in response to said interchange signals to provide power interchange at equal incremental costs of delivered power.

11. An electric power control system for controlling the generation of an integrated power transmission system having at least three interconnected local power generating systems, each local system including means to automatically control generation of the generating stations therein at equal incremental costs of delivered power within its respective local system comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means combining said incremental power and incremental wheeling cost signals and providing opposite interchange power signals for each of said systems of the pair being compared, and means to vary the generation of said local systems in response to said interchange signals to provide power interchange between the local systems at equal incremental costs of delivered power and thereby economic generation of the integrated system.

12. An electric power control system for controlling the generation of an integrated power transmission system having at least three interconnected local power generating systems, each local system including means to automatically control generation of the generating stations therein at equal incremental costs of delivered power within its respective local system comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means combining said incremental power and incremental wheeling cost signals and providing opposite interchange power signals for each of said systems of the pair being compared, and means to vary the generation of said local systems in response to scheduled power interchange modified by said interchange signals to provide power interchange on tie lines at equal incremental costs of delivered power and thereby economic generation of the integrated system.

13. An electric power control system for controlling the generation of an integrated power transmission system having at least three interconnected local power generating systems, each local system including means to automatically control generation of the generating stations therein at equal incremental costs of delivered power within its respective local system comprising: at least one tie line interconnecting each of said local systems with at least one other of said local systems, means to provide incremental power cost comparisons between $n-1$ different pairs of local power systems, each of said local power systems being included in at least one of said power cost comparisons, said cost comparison means receiving incremental power cost signals for interchanging power between the pair of local systems being compared thereby plus an incremental wheeling cost signal from at least one other local system of said integrated system, said comparison means combining said incremental power and incremental wheeling cost signals and providing opposite interchange power signals for each of said systems of the pair being compared, and means to vary the generation of said local systems in response to scheduled power interchange modified by said interchange signals to provide power interchange between local systems at equal incremental costs of delivered power and economic generation of the integrated system.

14. An electric power control system for controlling the generation of an integrated power transmission system having at least three interconnected local power generating system, each local system including means to automatically control generation of the generating stations therein at equal incremental costs of delivered power comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means providing interchange power signals for each of said systems of the pair being compared, and means ot vary the generation of said local systems in response to said interchange signals to provide power interchange between local systems and power generation within each local system at equal incremental costs of delivered power.

15. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means providing interchange power signals for each of said systems of the pair being compared, and means to vary the generation of said local systems in response to said interchange signals and said automatic control to deliver power to any point within the integrated system from substantially all sources at equal incremental costs.

16. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means combining said incremental power cost and wheeling cost signals and providing interchange power signals for each of said local systems of the pair being compared, and means to vary the generation of said local systems in response to said interchange signals and said automatic control to deliver power to any point within the integrated system from substantially all sources at equal incremental costs.

17. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means combining said incremental power cost and wheeling cost signals and providing equal and opposite effect interchange power signals for each of said local systems of the pair being compared, and means to vary the generation of said local systems in response to said interchange signals and said automatic control to deliver power to any point within the integrated system from substantially all sources at equal incremental costs.

18. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means combining said incremental power cost and wheeling cost signals and providing equal and opposite effect interchange power signals for each of said local systems of the pair being compared, at least one system being the reference system for cost comparisons between the reference and at least two other systems, said reference system, means to combine the plurality of interchange signals developed for said reference system, and means to vary the generation of said local systems in response to said interchange signals and said automatic control to deliver power to any point within the integrated system from substantially all sources at equal incremental costs.

19. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means combining said incremental power cost and wheeling cost signals and providing equal and opposite effect interchange power signals for each of said local systems of the pair being compared, at least one local system being the reference system for cost comparisons between the reference and at least two other local systems, means to combine the plurality of interchange signals developed for said reference system, and means to vary the generation of said local systems in response to said interchange signals and said automatic control to deliver power to any point within the integrated system from substantially all sources at equal incremental costs, said last named means including means to combine said interchange power signals for each local system with signals representing the scheduled and actual load interchange thereof.

20. An electrical power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means algebraically combining said incremental power cost and wheeling cost signals and providing equal and opposite effect interchange power signals from the algebraic sum thereof for each of said local systems of the pair being compared, at least one local system being the reference system for cost comparisons between the reference and at least two other local systems, means to combine the plurality of interchange signals developed for said reference system, and means to vary the generation of said local systems in response to said interchange signals and said automatic control to deliver power to any point within the integrated system from substantially all sources at equal incremental costs, said last named means including means to combine said interchange power signals for each local system with signals representing the scheduled and actual load interchange thereof.

21. An electric power control system for controlling the generation of an integrated power transmission system having at least three interconnected local power generating systems, each local system including means to automatically control generation of the generating stations therein at equal incremental costs of delivered power comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other system of said integrated system, said comparison means algebraically combining said incremental power cost and wheeling cost signals and providing equal and opposite effect modifying interchange power signals from the algebraic sum thereof for each of said systems of the pair being compared, at least one system being a reference system for cost comparisons between at least two other systems, means to combine the plurality of modifying interchange signals developed for each said reference system with signals representing the scheduled power interchange and actual power interchange to provide resultant reference system interchange signals, means for the local systems other than said reference systems to combine the modifying interchange power signal thereof with signals representing the scheduled and actual load interchange thereof to provide resultant interchange signals, and means to vary the generation of said local systems in response to the respective resultant interchange signals and said automatic control to deliver power to any point within the integrated system from substantially all sources at equal incremental costs.

22. An electric power control system for controlling the generation of an integrated power transmission system having at least three interconnected local power generating systems, each local system including means to automatically control generation of the generating stations therein at equal incremental costs of delivered power comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other system of said integrated system, said comparison means algebraically combining said incremental power cost and wheeling cost signals and providing equal and opposite effect direct current modifying interchange power signals from the algebraic sum thereof for each of said systems of the pair being compared, at least one system being a reference system for cost comparisons between at least two other systems, means to combine the plurality of modifying interchange signals developed for each said reference system with direct current signals representing the scheduled power interchange and actual power interchange to provide resultant reference system interchange signals, means for the local systems other than said reference systems to combine the modifying interchange power signal thereof with direct current signals representing the scheduled and actual load interchange thereof to provide resultant interchange signals, and means to vary the generation of said local systems in response to the respective resultant interchange signals and said automatic control to deliver power to any point within the integrated system from substantially all sources at equal incremental costs.

23. An electric power control system for controlling the generation of an integrated power transmission system having at least three interconnected local power generating systems, each local system including means to automatically control generation of the generating stations therein at equal incremental costs of delivered power comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other system of said integrated system, said incremental power and wheeling cost signals being in the form of shaft rotations, said comparison means comprising a mechanical differential algebraically combining said incremental power cost and wheeling cost signals and providing equal and opposite effect direct current modifying interchange power signals from the algebraic sum thereof for each of said systems of the pair being compared, said direct current signals being provided by the actuation in accordance with the output of said mechanical differential of a potentiometer in circuit with a direct current source, at least one system being a reference system for cost comparisons between at least two other systems, means to combine the plurality of modifying interchange signals developed for each said reference system with direct current signals representing the scheduled power interchange and actual power interchange thereof to provide resultant reference system interchange signals, means for the local systems other than said reference systems to combine the modifying interchange power signal thereof with direct current signals representing the scheduled and actual load interchange thereof to provide resultant interchange signals, and means to vary the generation of said local systems in response to the respective resultant interchange signals and said automatic control to deliver power to any point within the integrated system from substantially all sources at equal incremental costs.

24. An electrical power control system for controlling the generation of an integrated power transmission system having a least three interconnected local power generating systems, each local system including means to automatically control generation of the generating stations therein at equal incremental costs of delivered power comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other system of said integrated system, said incremental power and wheeling cost signals being in the form of shaft rotations and being provided by the automatic control equipment of the local system associated therewith, said comparison means comprising a mechanical differential algebraically combining said incremental power cost and wheeling cost signals and providing equal and opposite effect direct current modifying interchange power signals from the algebraic sum thereof for each of said systems of the pair being compared, said direct current signals being provided by the actuation in accordance with the output of said mechanical differential of a potentiometer in circuit with a direct current source, at least one system being a reference system for cost comparisons between at least two other systems, means at said local system automatic control means to combine the plurality of modifying interchange signals developed for each said reference system with direct current signals representing the scheduled power interchange and actual power interchange thereof to provide resultant reference system interchange signals, means at the local system control means other than said reference systems to combine the modifying interchange power signal thereof with direct current signals representing the scheduled and actual load interchange thereof to provide resultant interchange signals, and means to vary the generation of said local systems in response to the respective resultant interchange signals and said automatic control to deliver power to any point within the integrated system from substantially all sources at equal incremental costs.

25. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling power cost signal from at least one other system of said integrated system, said comparison means combining said incremental power and incremental wheeling cost signals and providing interchange power signals for each of said systems of the pair being compared, and means to vary the generation of said local systems in response to said interchange signals to provide power interchange based upon economic considerations, said incremental wheeling cost signal being related to:

$$\sum_{k}\left(\lambda_c \frac{\partial L_{Tc}}{\partial P_{ck}}\right)\frac{\partial P_{ck}}{\partial P_{ea}}$$

where:

$k$ = number of external tie lines connected to local system C, the system providing the incremental wheeling cost signal $\lambda_c$ = incremental cost of received power in local system C $\dfrac{\partial L_{Tc}}{\partial P_{ck}}$ = incremental transmission loss in local system C for a particular tie $P_{ck}$ $\dfrac{\partial P_{ck}}{\partial P_{ea}}$ = ratio of change of tie flow $P_{ck}$ into system C to change in $P_{ea}$ when an increment of power is delivered between the hypothetical loads of the pair of local systems, A and B, being compared $P_{ck}$ = tie line flows into system C $$P_{ea}=-\sum_{i}P_{ai}$$

$i$ = number of external tie lines connected to system A, and $P_{ai}$ = tie line flows into system A 26. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local ssytems being compared thereby plus an incremental wheeling cost signal from at least one other local system of said integrated system, said comparison means combining said incremental power and incremental wheeling cost signals and providing opposite interchange power signals for each of said systems of the pair being compared, and means to vary the generation of said local systems in response to said interchange signals to provide power interchange at equal incremental costs of delivered power, said incremental wheeling cost signal being related to:

$$\sum_k \left( \lambda_c \frac{\partial L_{Tc}}{\partial P_{ck}} \right) \frac{\partial P_{ck}}{\partial P_{ea}}$$

where:

$k$ = number of external tie lines connected to local system C, the system providing the incremental wheeling cost signal $\lambda_c$ = incremental cost of received power in local system C $\frac{\partial L_{Tc}}{\partial P_{ck}}$ = incremental transmission loss in local system C for a particular tie $P_{ck}$ $\frac{\partial P_{ck}}{\partial P_{ea}}$ = ratio of change of tie flow $P_{ck}$ into system C to change in $P_{ea}$ when an increment of power is delivered between the hypothetical loads of the pair of local systems, A and B, being compared $P_{ck}$ = tie line flows into system C $P_{ea} = -\sum_i P_{ai}$ $i$ = number of external tie lines connected to system A, and $P_{ai}$ = tie line flows into system A 27. An electric power control system for controlling the generation of an integrated power transmission system having at least three interconnected local power generating systems, each local system including means to automatically control generation of the generating stations therein at equal incremental costs of delivered power within its respective local system comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means combining said incremental power and incremental wheeling cost signals and providing opposite interchange power signals for each of said systems of the pair being compared, and means to vary the generation of said local systems in response to scheduled power interchange modified by said interchange signals to provide power interchange at equal incremental costs of delivered power and economic generation of the integrated system, said incremental wheeling cost signal being related to:

$$\sum_k \left( \lambda_c \frac{\partial L_{Tc}}{\partial P_{ck}} \right) \frac{\partial P_{ck}}{\partial P_{ea}}$$

where:

$k$ = number of external tie lines connected to local system C, the system providing the incremental wheeling cost signal $\lambda_c$ = incremental cost of received power in local system C $\frac{\partial L_{Tc}}{\partial P_{ck}}$ = incremental transmission loss in local system C for a particular tie $P_{ck}$ $\frac{\partial P_{ck}}{\partial P_{ea}}$ = ratio of change of tie flow $P_{ck}$ into system C to change in $P_{ea}$ when an increment of power is delivered between the hypothetical loads of the pair of local systems, A and B, being compared $P_{ck}$ = tie line flows into system C $P_{ea} = -\sum_i P_{ai}$ $i$ = number of external tie lines connected to system A, and $P_{ai}$ = tie line flows into system A 28. An electric power control system for controlling the generation of an integrated power transmission system having at least three interconnected local power generating systems, each local system including means to automatically control generation of the generating stations therein comprising: tie lines interconnecting each of said local systems with at least one other of said local systems, means to provide incremental power cost comparisons between $n-1$ different pairs of local power systems, said cost comparison means receiving incremental power cost signals for interchanging power between the pair of local systems being compared thereby plus an incremental wheeling cost signal from at least one other local system of said integrated system, said comparison means combining said incremental power cost and wheeling cost signals and providing equal and opposite effect interchange power signals for each of said local systems of the pair being compared, at least one system being the reference system for cost comparisons between the reference and at least two other systems, means to combine the plurality of interchange signals developed for said reference system, and means to vary the generation of said local systems in response to said interchange signals and said automatic control to deliver power to any point within the integrated system from substantially all sources at equal incremental costs, said incremental wheeling cost signal being related to:

$$\sum_k \left( \lambda_c \frac{\partial L_{Tc}}{\partial P_{ck}} \right) \frac{\partial P_{ck}}{\partial P_{ea}}$$

where $k$ = number of external tie lines connected to local system C, the system providing the incremental weheling cost signal $\lambda_c$ = incremental cost of received power in local system C $\frac{\partial L_{Tc}}{\partial P_{ck}}$ = incremental transmission loss in local system C for a particular tie $P_{ck}$ $\frac{\partial P_{ck}}{\partial P_{ea}}$ = ratio of change of tie flow $P_{ck}$ into system C to change in $P_{ea}$ when an increment of power is delivered between the hypothetical loads of the pair of local systems, A and B, being compared $P_{ck}$ = tie line flows into system C $P_{ea} = -\sum_i P_{ai}$ $i$ = number of external tie lines connected to system A, and $P_{ai}$ = tie line flows into system A References Cited in the file of this patent

UNITED STATES PATENTS

| 2,692,342 | Nichols et al. | Oct. 19, 1954 |
| 2,923,832 | Cohn | Feb. 2, 1960 |